(12) United States Patent
Haupt et al.

(10) Patent No.: US 9,803,723 B2
(45) Date of Patent: Oct. 31, 2017

(54) MULTI-STEP AUTOMATIC GEARBOX

(71) Applicant: ZF Friedrichshafen AG, Friedrichshafen (DE)

(72) Inventors: Josef Haupt, Tettnang (DE); Martin Brehmer, Tettnang (DE); Christoph Margraf, Markdorf (DE); Stefan Beck, Eriskirch (DE); Christian Sibla, Eriskirch (DE)

(73) Assignee: ZF FRIEDRICHSHAFEN, Friedrichshafen (DE)

( * ) Notice: Subject to any disclaimer, the term of this patent is extended or adjusted under 35 U.S.C. 154(b) by 0 days.

(21) Appl. No.: 15/023,220

(22) PCT Filed: Mar. 19, 2014

(86) PCT No.: PCT/EP2014/055460
§ 371 (c)(1),
(2) Date: Mar. 18, 2016

(87) PCT Pub. No.: WO2015/039768
PCT Pub. Date: Mar. 26, 2015

(65) Prior Publication Data
US 2016/0230849 A1  Aug. 11, 2016

(30) Foreign Application Priority Data

Sep. 20, 2013 (DE) .................. 10 2013 218 941
Dec. 12, 2013 (DE) .................. 10 2013 225 770

(51) Int. Cl.
*F16H 3/66* (2006.01)
*F16H 3/62* (2006.01)
*F16H 3/44* (2006.01)

(52) U.S. Cl.
CPC ............... *F16H 3/66* (2013.01); *F16H 3/666* (2013.01); *F16H 2003/445* (2013.01);
(Continued)

(58) Field of Classification Search
CPC ... F16H 3/62; F16H 3/66; F16H 3/666; F16H 2200/2064; F16H 2200/0065
See application file for complete search history.

(56) References Cited

U.S. PATENT DOCUMENTS 7,789,792 B2   9/2010   Kamm et al.
8,007,394 B2   8/2011   Phillips et al.
(Continued)

FOREIGN PATENT DOCUMENTS

DE   102005002337   8/2006
DE   102007055808   6/2009
(Continued)

OTHER PUBLICATIONS

International Search Report (English Translation) PCT/EP2014/055460, dated Jul. 7, 2014. (3 pages).

*Primary Examiner* — Jacob S Scott
*Assistant Examiner* — Tinh Dang
(74) *Attorney, Agent, or Firm* — Dority & Manning, P.A.

(57) ABSTRACT

An automatic transmission has a first clutch shaft that constantly connects first and fourth planetary gear sets, a second clutch shaft that constantly connects second and third planetary gear sets, and a third clutch shaft that constantly connects the third and first planetary gear sets. A drive shaft is constantly connected to the fourth planetary gear set; an output shaft is constantly connected to the third planetary gear set. The first planetary gear set is directly connected to two shift elements, the second planetary gear set is directly connected to four shift elements, the third planetary gear set is directly connected to two shift elements, the fourth planetary gear set is directly connected to four shift elements. The drive shaft is directly connected to only one shift element. The output shaft is directly connected to only one shift element.

35 Claims, 20 Drawing Sheets

(52) U.S. Cl.
CPC .......... *F16H 2003/447* (2013.01); *F16H 2200/0065* (2013.01); *F16H 2200/0069* (2013.01); *F16H 2200/2012* (2013.01); *F16H 2200/2046* (2013.01); *F16H 2200/2048* (2013.01); *F16H 2200/2064* (2013.01); *F16H 2200/2094* (2013.01)

(56) References Cited

U.S. PATENT DOCUMENTS

| | | |
|---|---|---|
| 8,465,390 B2 | 6/2013 | Brehmer et al. |
| 8,574,114 B2 | 11/2013 | Brehmer et al. |
| 8,663,055 B2 | 3/2014 | Brehmer et al. |
| 8,858,387 B2 * | 10/2014 | Haupt ............... F16H 3/66 475/282 |
| 8,876,652 B2 * | 11/2014 | Mellet ............... F16H 3/62 475/282 |
| 2008/0234093 A1 | 9/2008 | Diosi et al. |
| 2010/0331137 A1 | 12/2010 | Kamm et al. |

FOREIGN PATENT DOCUMENTS

| | | |
|---|---|---|
| DE | 102009005648 A1 | 8/2009 |
| DE | 102009001253 | 6/2010 |
| DE | 102010040002 A1 | 3/2012 |
| WO | WO 2007006449 A1 | 1/2007 |
| WO | WO 2011026833 A1 | 3/2011 |

* cited by examiner

| Gear | Shift Elements | | | | | | Ratio | Gear Step |
|------|---|---|---|---|---|---|---|---|
|      | A | B | C | D | E | F | i | φ |
| G1 | X | X | X |   |   | X | 5,299 |       |
|    |   |   |   |   |   |   |       | 1,588 |
| G2 | X | X |   |   | X | X | 3,337 |       |
|    |   |   |   |   |   |   |       | 1,532 |
| G3 |   | X | X |   | X | X | 2,178 |       |
|    |   |   |   |   |   |   |       | 1,251 |
| G4 |   | X |   | X | X | X | 1,741 |       |
|    |   |   |   |   |   |   |       | 1,096 |
| G5 |   | X | X | X | X |   | 1,589 |       |
|    |   |   |   |   |   |   |       | 1,198 |
| G6 |   | X | X | X |   | X | 1,326 |       |
|    |   |   |   |   |   |   |       | 1,326 |
| G7 |   |   | X | X | X | X | 1,000 |       |
|    |   |   |   |   |   |   |       | 1,226 |
| G8 | X |   | X | X |   | X | 0,816 |       |
|    |   |   |   |   |   |   |       | 1,296 |
| G9 | X |   |   | X | X | X | 0,630 |       |
|    |   |   |   |   |   |   |       | Total |
| R  | X | X |   | X |   | X | -3,727 | 8,417 |

Fig. 2

| Gear | Shift Elements ||||||  Ratio | Gear Step |
|------|---|---|---|---|---|---|------|-------|
|      | A | B | C | D | E | F | i    | φ     |
| G1   | X | X | X |   |   | X | 5,501 |       |
|      |   |   |   |   |   |   |      | 1,589 |
| G2   | X | X |   |   | X | X | 3,463 |       |
|      |   |   |   |   |   |   |      | 1,574 |
| G3   |   | X | X |   | X | X | 2,200 |       |
|      |   |   |   |   |   |   |      | 1,264 |
| G4   |   | X |   | X | X | X | 1,741 |       |
|      |   |   |   |   |   |   |      | 1,092 |
| G5   |   | X | X | X | X |   | 1,594 |       |
|      |   |   |   |   |   |   |      | 1,201 |
| G6   |   | X | X | X |   | X | 1,328 |       |
|      |   |   |   |   |   |   |      | 1,328 |
| G7   |   |   | X | X | X | X | 1,000 |       |
|      |   |   |   |   |   |   |      | 1,226 |
| G8   | X |   | X | X |   | X | 0,816 |       |
|      |   |   |   |   |   |   |      | 1,296 |
| G9   | X |   |   | X | X | X | 0,630 |       |
| R    | X | X |   | X |   | X | -3,929 | Total 8,736 |

Fig. 3

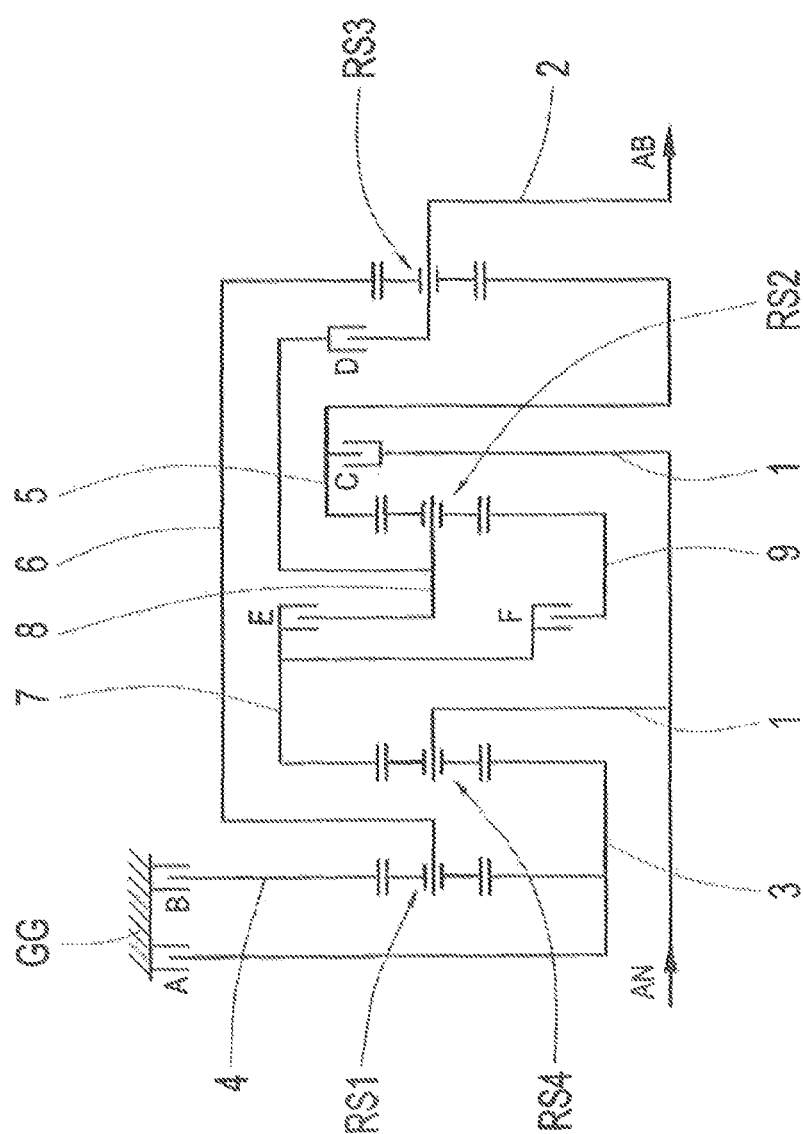

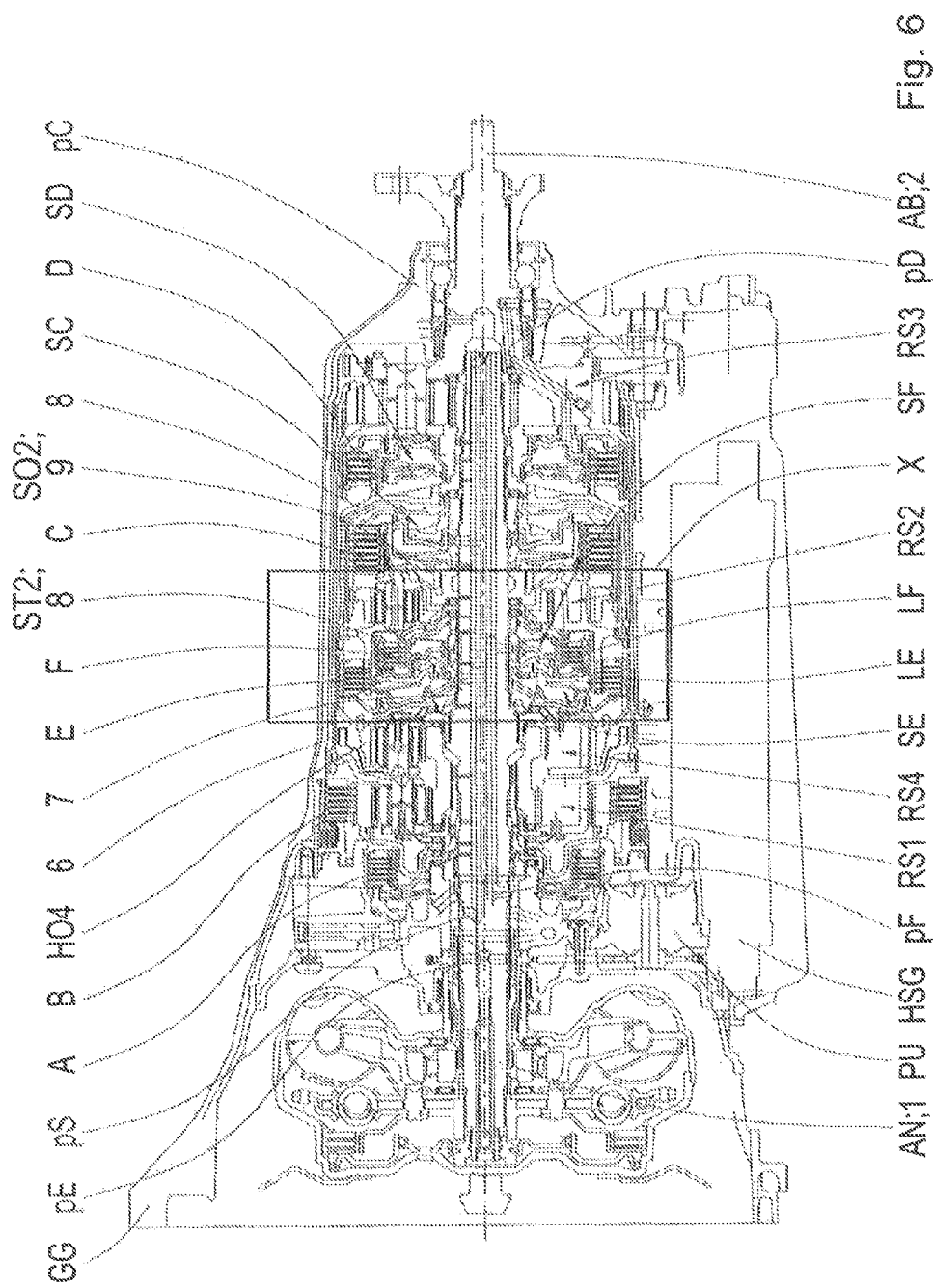

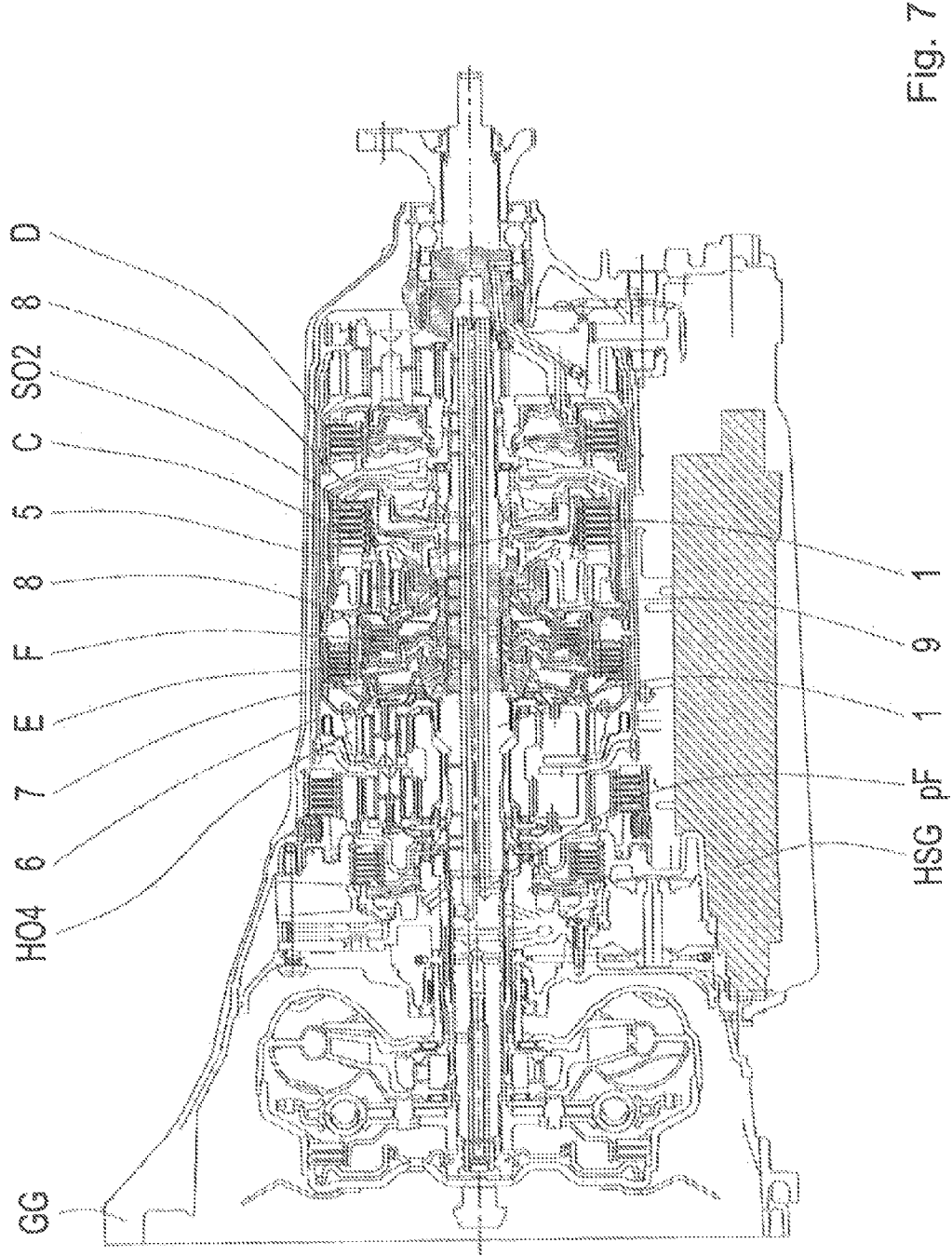

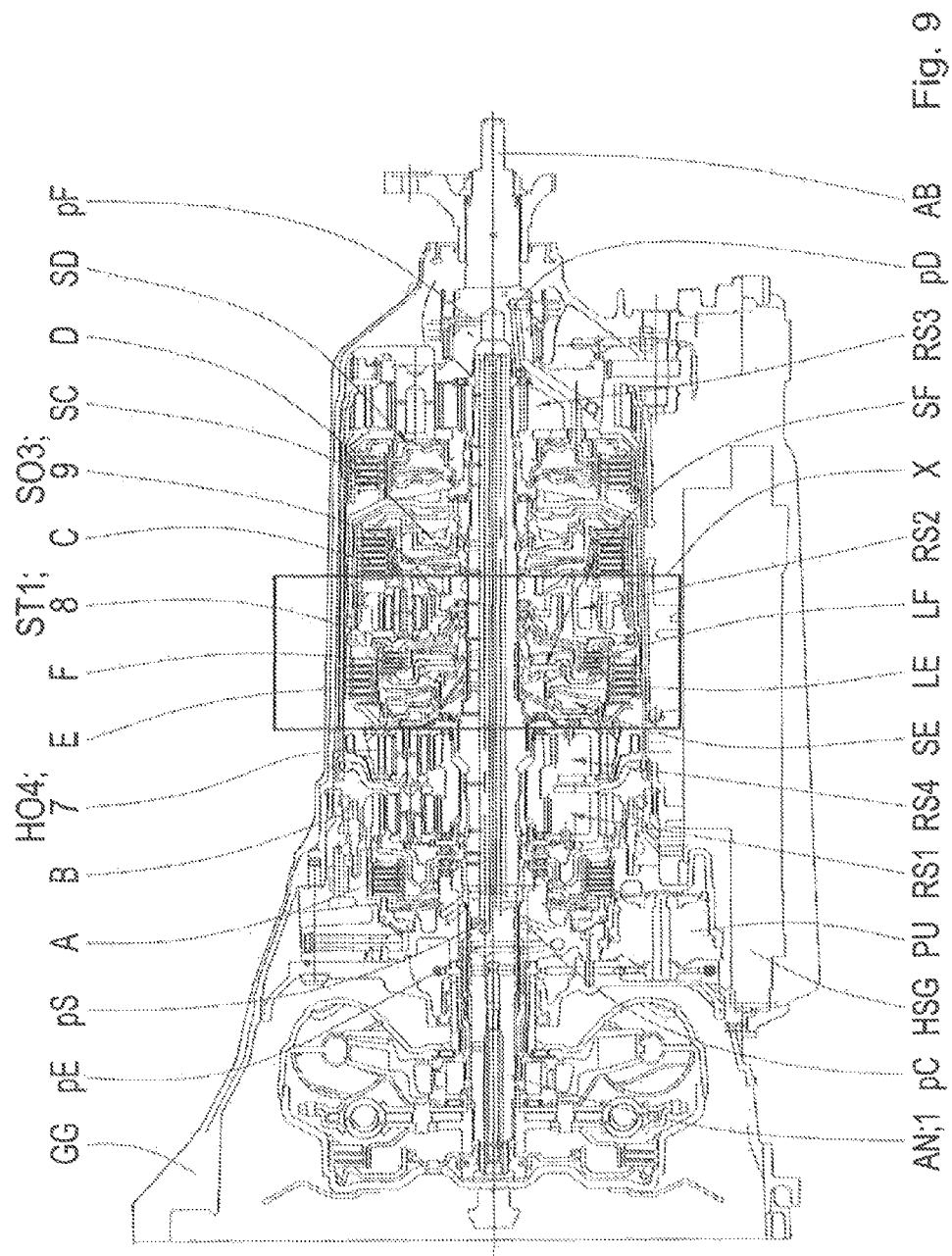

| Planetary Gear Set Type Combinations | | | |
|---|---|---|---|
| RS1 | RS4 | RS2 | RS3 |
| Minus | Minus | Minus | Minus |
| Plus | Minus | Minus | Minus |
| Minus | Plus | Minus | Minus |
| Minus | Minus | Plus | Minus |
| Plus | Plus | Minus | Minus |
| Plus | Minus | Plus | Minus |
| Minus | Plus | Plus | Minus |
| Plus | Plus | Plus | Minus |

Fig. 10

| Gear | Engaged Shift Elements | | | | | | |
|---|---|---|---|---|---|---|---|
| | Brakes | | Clutches | | | | |
| | A | B | C | D | E | F | G |
| 1 | X | X | | | | X | X |
| 2 | X | X | X | | | X | |
| 3 | X | X | | | X | X | |
| 4 | | X | X | | X | X | |
| 5 | | X | | X | X | X | |
| 6 | | X | X | X | X | | |
| 7 | | X | X | X | | X | |
| 8 | | | X | X | X | X | |
| 9 | X | | X | X | | X | |
| 10 | X | | | X | X | X | |
| R | X | X | | X | | X | |

Fig. 15

| Planetary Gear Set Type Combinations ||||
| --- | --- | --- | --- |
| RS1 | RS4 | RS2 | RS3 |
| Minus | Minus | Minus | Minus |
| Plus | Minus | Minus | Minus |
| Minus | Minus | Plus | Minus |
| Plus | Minus | Plus | Minus |

Fig. 16

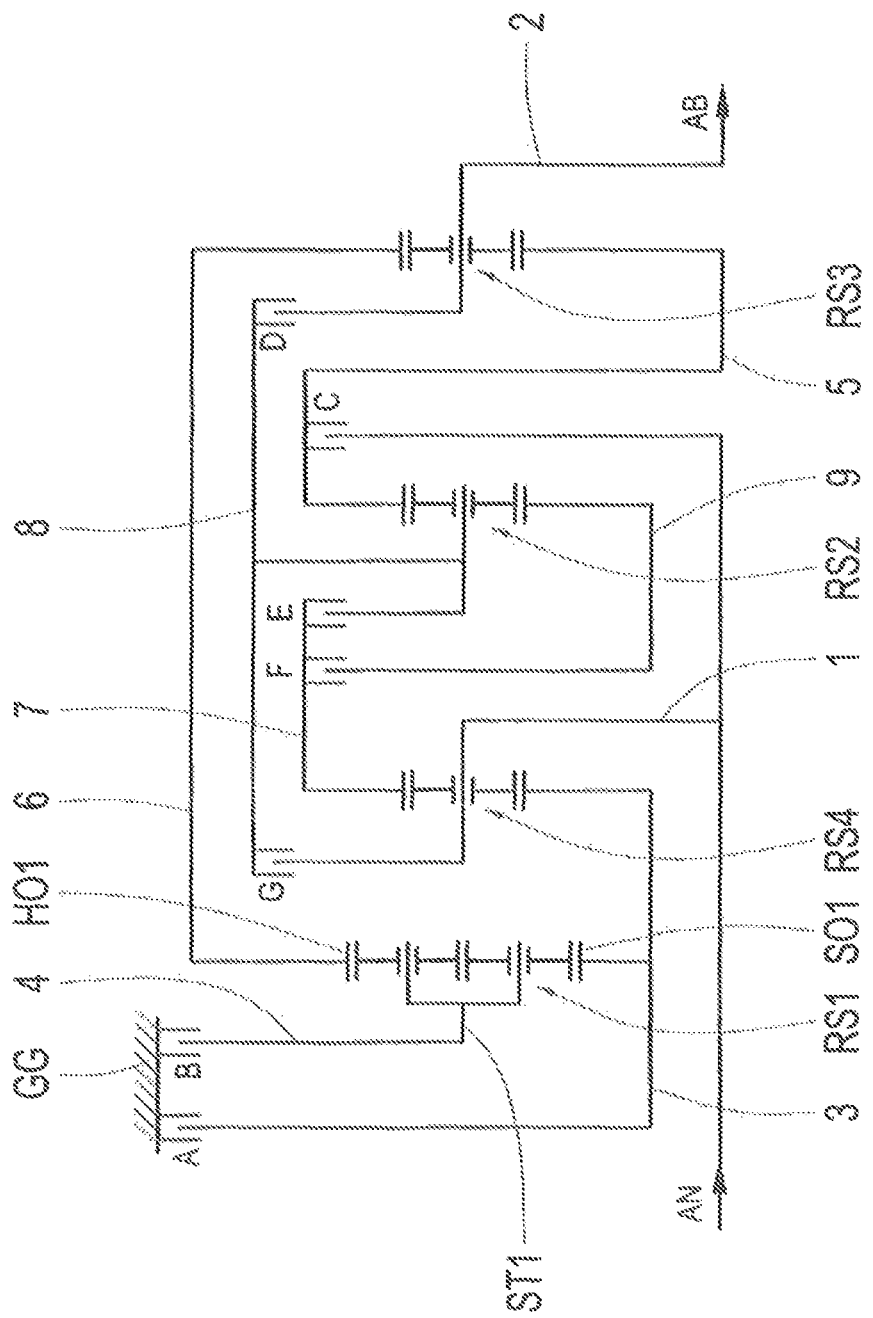

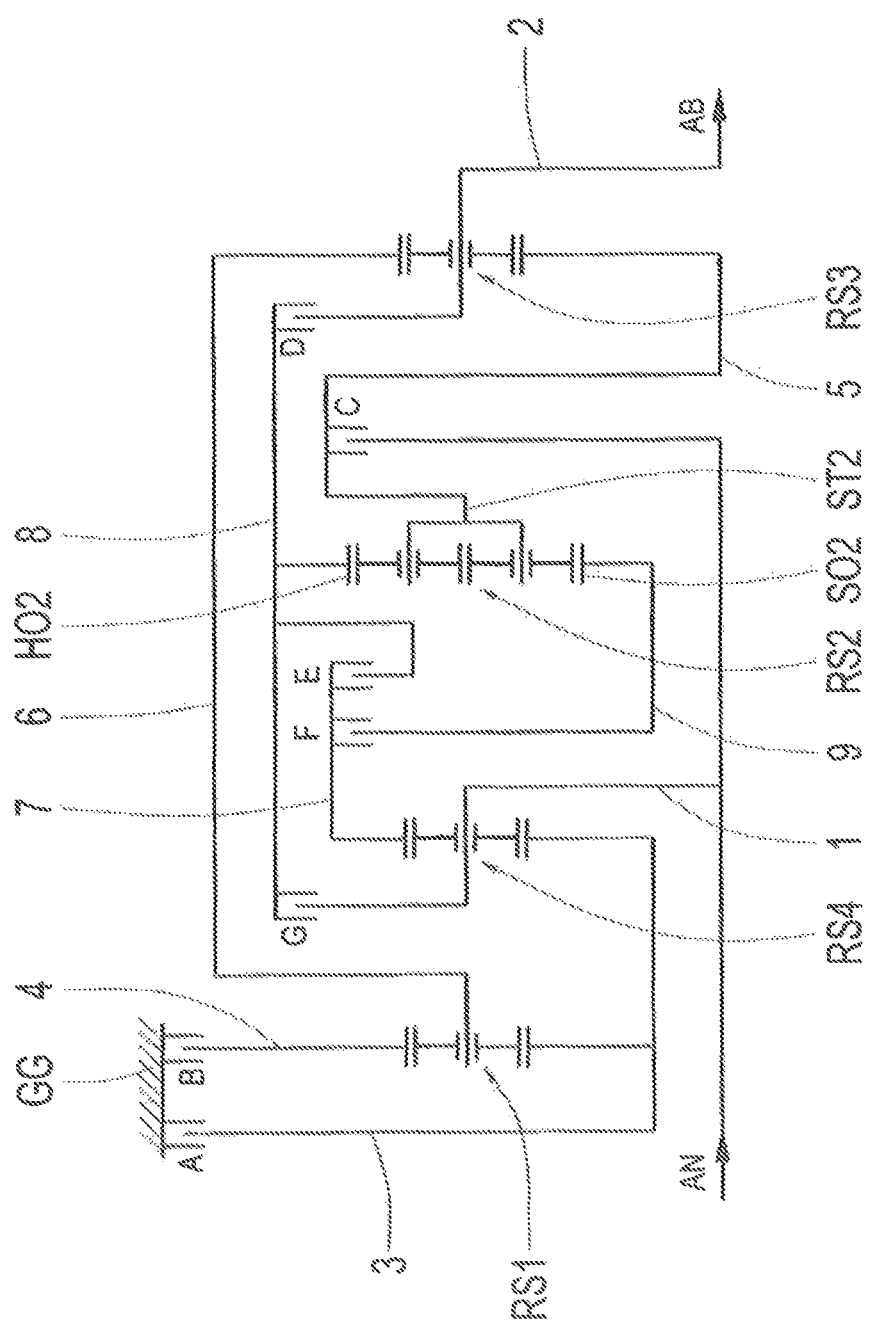

MULTI-STEP AUTOMATIC GEARBOX

FIELD OF THE INVENTION

This present subject matter relates generally to a multi-speed automatic transmission in planetary design, in particular for a motor vehicle, comprising one drive shaft, one output shaft, four planetary gear sets (coupled to each other through three clutch shafts) and at least six shift elements.

BACKGROUND

Generally, automatically shiftable vehicle transmissions in planetary design are already well described in the state of the art, and are subject to continuous development and improvement. Such transmissions preferably features a sufficient number of forward gears, one reverse gear, and a transmission ratio that is well-suited for motor vehicles with a high overall spread, favorable progressive steps, and a sufficiently large start-up transmission ratio for the specific application. In addition, this transmission preferably requires low construction costs, in particular a low number of shift elements and, upon a sequential shifting operation, should avoid so-called "group gearshifts," such that, when there are gearshifts to the next higher or next lower gear, only one previously engaged shift element is open, and one previously open shift element is engaged.

Such a four-speed automatic transmission emerges, for example, from DE 10 2005 002 337 A1 of the applicant. It essentially comprises one drive shaft, one output shaft, a total of four individual planetary gear sets and five shift elements. By selectively blocking three of the five shift elements designed as clutches and brakes, a total of eight forward gears can be shifted without any group gearshifts.

From DE 10 2007 055 808 A1 of the applicant, a further development of the 8-gear automatic transmission known from DE 10 2005 002 337 A1 is known. Through the kinematic connection of an additional sixth shift element to the existing gear set diagram—specifically in the power flow between two existing shafts of the transmission—two additional forward gears could be represented. Through this sixth shift element formed as a clutch, a clutch shaft, which constantly connects a first planetary gear set that is connectable to the housing to a third planetary gear set that is connected to the output shaft, is now connectable to the second planetary gear set that can be blocked by engaging the fifth of the previously existing five shift elements. Moreover, this additional sixth shift element, in conjunction with the previously existing fourth of the five shift elements, enables the blocking of the third planetary gear set connected to the output shaft. With their transmission ratios, the new gears are between the previous fifth and sixth gears and between the previous sixth and seventh gears of the 8-gear transmission.

From DE 10 2009 001 253 B3 of the applicant, an additional development of the 8-gear automatic transmission is known from DE 10 2005 002 337 A1. Here, by adding a sixth shift element formed as a clutch in the power flow between the drive shaft and the second planetary gear set that can be blocked by engaging the fifth of the previously existing five shift elements, an additional forward gear can be represented, the transmission ratio of which is greater than the previous first gear of the 8-gear transmission. Thus an additional starting gear is created below the previous first gear of the 8-gear transmission.

An additional 10-gear automatic transmission with four individual planetary gear sets and six shift elements is known from U.S. Pat. No. 8,007,394 B2; this differs from the gear set diagram of DE 10 2007 055 808 A1 only in three design details. First, with U.S. Pat. No. 8,007,394 B2, the output shaft is connected only to the planetary gear carrier of the third planetary gear set; the clutch provided with DE 10 2007 055 808 A1 is thus not present in the power flow between the planetary gear carrier of the third planetary gear set and the planetary gear carrier of the second planetary gear. Second, with U.S. Pat. No. 8,007,394 B2, a shiftable connection is provided between the ring gear of the fourth planetary gear set and the sun gear of the second planetary gear set, in place of the constant coupling of the ring gear of the fourth planetary gear set with the sun gear of the second planetary gear set with DE 10 2007 055 808 A1. Third, with U.S. Pat. No. 8,007,394 B2, a clutch is provided in the power flow between the ring gear of the fourth planetary gear set and the planetary gear carrier of the second planetary gear set. Such kinematics of the transmission of U.S. Pat. No. 8,007,394 B2 requires that, for the shifting without group gearshifts of the ten forward gears in each gear, four of the six shift elements are engaged.

SUMMARY OF THE INVENTION

This present subject matter is subject to the task of further developing a multi-speed transmission of the aforementioned type with a total of four planetary gear sets. Thereby, in addition to a high number of gears, the transmission is to feature a large gear spread with a gear gradation acceptable in terms of drivability and, in the main driving gears, a favorable degree of efficiency—thus relatively low drag losses and gearing losses.

Such task is achieved through an automatic transmission according to the aspects of the invention. Additional objects and advantages of the invention will be set forth in part in the following description, or may be obvious from the description, or may be learned through practice of the invention.

Accordingly, in a first solution in accordance with exemplary aspects of the invention, an automatic transmission in planetary design is proposed; this features one drive shaft, one output shaft, four individual planetary gear sets and six shift elements, the selective meshing of which brings about different transmission ratio relationships between the drive shaft and the output shaft. In a second solution in accordance with exemplary aspects of the invention, an additional seventh shift element is provided. The four individual planetary gear sets are connected to each other through three clutch shafts, whereas the first clutch shaft constantly connects the first planetary gear set to the fourth planetary gear set, the second clutch shaft constantly connects the second planetary gear set to the third planetary gear set and the third planetary gear set constantly connects the third planetary gear set to the first planetary gear set. The drive shaft is constantly connected to the fourth planetary gear set, while the output shaft is constantly connected to the third planetary gear set.

With respect to the coupling of the six shift elements of the planetary gear sets of the automatic transmission in accordance with exemplary aspects of the invention, it is provided that the first planetary gear set is directly connected to two shift elements, that the second planetary gear set is directly connected to four shift elements, that the third planetary gear set is directly connected to two shift elements and that the fourth planetary gear set is directly connected to four shift elements. With respect to the coupling of the shift elements at the input and the output of the transmission, it is provided that the drive shaft is directly connected to one of the six shift elements, and that the output shaft is also directly connected to one of the six shift elements.

If, as with the second solution in accordance with exemplary aspects of the invention, an additional seventh shift element is provided, the first planetary gear set is directly connected to two shift elements, the second planetary gear set is directly connected to five shift elements, the third planetary gear is directly connected to two shift elements, the fourth planetary gear set is directly connected to five shift elements, the drive shaft is directly connected to two shift elements and the output shaft is directly connected to one shift element.

Thereby, with the formulation of "directly connected" in connection with the coupling of a shift element to a planetary gear set, it must be understood that the input or output element of the respective shift element is coupled to one of the elements of the respective planetary gear set through a torque-proof or torsionally flexible connection, such that there is always a fixed rotational speed relationship between the planetary gear set and the input or output element.

In connection with the coupling of a shift element to a shaft, with the formulation of "directly connected," it must be understood that the input or output element of the respective shift element is directly connected to the respective shaft through a torque-proof or torsionally flexible connection, such that there is always a fixed rotational speed relationship between this shaft and the input or output element of this shift element.

In connection with the coupling of a planetary gear set to another planetary gear set, with the formulation of "directly connected," it must be understood that one of the elements of the respective planetary gear set is directly connected to one of the elements of the respective other planetary gear set through a torque-proof or torsionally flexible connection, such that there is always a fixed rotational speed relationship between this shaft and the input or output element of this shift element.

Thereby, the automatic transmission proposed in accordance with the exemplary aspects of invention differs from the transmission known from DE 10 2005 002 337 A1 by the number of shift elements (now six instead of five), and by the fact that the second planetary gear set is now directly connected to four (instead of only three) shift elements and the fourth planetary gear set is now also directly connected to four shift elements (instead of only three). The automatic transmission proposed in accordance with exemplary aspects of the invention may also differ from the transmissions known from DE 10 2005 002 337 A1 by the number of shift elements (now seven instead of five) and by the fact that the second planetary gear set is now directly connected to five (instead of three) shift elements and the fourth planetary gear set is now also directly connected to five (instead of only three) shift elements.

The automatic transmission in accordance with exemplary aspects of the invention differs from the transmission known from DE 10 2007 055 808 A1 by the fact that the third planetary gear set connected to the output shaft is directly connected to only two (instead of four) shift elements.

The automatic transmission in accordance with exemplary aspects of the invention differs from the transmission known from DE 10 2009 001 253 A1 by the fact that the third planetary gear set connected to the output shaft is directly connected to only two (instead of three) shift elements.

The automatic transmission in accordance with exemplary aspects of the invention differs from the transmission known from U.S. Pat. No. 8,007,394 B2 by the fact that the output shaft is directly connected to one (instead of none) of the six shift elements, and that the first planetary gear set is directly connected to only two (instead of three) of the six shift elements.

Thereby, compared to the state of the art, the automatic transmission in accordance with exemplary aspects of the invention features fully independent kinematics. In an advantageous manner, at least nine forward gears and one reverse gear can be shifted.

With the automatic transmission in accordance with exemplary aspects of the invention, it is preferably provided that
 the first shift element is directly connected to the first and fourth planetary gear set,
 the second shift element is directly connected to the first planetary gear set,
 the third shift element is directly connected to the second, third and fourth planetary gear sets and the drive shaft,
 the fourth shift element is directly connected to the second and third planetary gear sets and the output shaft,
 the fifth shift element is directly connected to the second and fourth planetary gear sets, and
 the sixth shift element gear is directly connected to the second and fourth planetary gear sets.

If an additional seventh shift element is provided, such seventh shift element is directly connected to the drive shaft and the second planetary gear set. In an advantageous manner, it is possible that the additional seventh shift element is accommodated in the same installation space or in an installation space that is only slightly larger than what is necessary for the transmission in accordance with exemplary aspects of the invention with six shift elements.

With the formulation of "directly connected," it must in turn be understood that the input or output element of the respective shift element is coupled to one of the elements of the respective planetary gear set through a torque-proof or torsionally flexible connection, such that there is always a fixed rotational speed relationship between this planetary gear set and this input or output element.

Preferably, the fourth shift element is directly connected to the fifth shift element. Preferably, the fifth shift element is directly connected to the sixth shift element.

Each of the four planetary gear sets features three elements, namely a sun gear, a ring gear and a planetary gear carrier with planetary gears rotatably mounted on it.

All four planetary gear sets may be designed as so-called "negative planetary gear sets," the respective planetary sets of which mesh with the sun gear and the ring gear of the respective planetary gear set.

As an alternative to the design of the gear set system with four individual negative planetary gear sets, an individual negative planetary gear set may be replaced by a so-called "positive planetary gear set." As is well-known, a positive planetary gear set features a planetary gear carrier ("bar") with inner and outer planetary gears rotatably mounted on it, whereas each of the inner planetary gears meshes with each outer planetary gear and with the sun gear of the positive planetary gear set, while each of the outer planetary gears meshes with each inner planetary gear and with the ring gear of the positive planetary gear set. As an alternative to the design of the gear set system with four individual negative planetary gear sets, several of the negative planetary gear sets may also be replaced by positive planetary gear sets.

To ensure the same kinematics of the claimed gear set system, it is provided that the first element of each negative planetary gear set and the first element of each positive planetary gear set is formed as a sun gear, the second element of each negative planetary gear set is formed as a planetary gear carrier, while the second element of each positive planetary gear set is formed as a ring gear, and the third element of each negative planetary gear set is formed as a ring gear, while the third element of each positive planetary gear set is formed as a planetary gear carrier.

In additional exemplary arrangements of the invention, one or more of the following characteristics may be provided:

Each of the first and second shift elements is directly connected to a housing of the transmission.

The second planetary gear set can be blocked through the simultaneous locking of two of the shift elements—in particular through the simultaneous locking of the fifth and sixth shift elements (in the blocked state, as is known, the rotational speeds of the sun gear, the planetary gear carrier and the ring gear of this planetary gear set are known to be identical).

The first clutch shaft connects the first element of the first planetary gear set to the first element of the fourth planetary gear set.

The second clutch shaft connects the third element of the second planetary gear set to the first element of the third planetary gear set.

The third clutch shaft connects the third element of the third planetary gear set to the second element of the first planetary gear set.

The drive shaft is constantly connected to the second element of the fourth planetary gear set.

The output shaft is constantly connected to the second element of the third planetary gear set.

The following characteristics of additional exemplary arrangements of the invention relate to the coupling of the individual shift elements in the power flow of the transmission:

The first shift element may be arranged in the power flow between the first element of the first planetary gear set and the housing.

The second shift element may be arranged in the power flow between the first element of the first planetary gear set and the housing.

The third shift element may be arranged in the power flow between the first element of the third planetary gear set and the drive shaft.

The fourth shift element may be arranged in the power flow between the second element of the second planetary gear set and the second element of the third planetary gear set.

The fifth shift element may be arranged in the power flow between the second element of the second planetary gear set and the third element of the fourth planetary gear set.

The sixth shift element may be arranged in the power flow between the first element of the second planetary gear set and the third element of the fourth planetary gear set.

If a seventh shift element is provided, it can be arranged in the power flow between the second element of the second planetary gear set and the drive shaft.

Preferably, with the transmission in accordance with exemplary aspects of the invention, four of the shift elements are engaged in each gear. If six shift elements are provided, only two shift elements are not engaged in each gear. If seven shift elements are provided, three of the shift elements are not engaged in each gear. Upon a change from one gear to the subsequent higher or lower gear, only one of the previously engaged shift elements is open and one previously open shift element is engaged, such that, upon sequential upshifts and downshifts, group gearshifts are avoided.

In order to, with six shift elements, represent at least nine forward gears and at least one reverse gear, such a transmission may feature the following shifting logic or gear logic: in the first forward gear, the first, second, third and sixth shift elements are engaged or transfer torque. In the second forward gear, the first, second, fifth and sixth shift elements are engaged or transfer torque. In the third forward gear, the second, third, fifth and sixth shift elements are engaged or transfer torque. In the fourth forward gear, the second, fourth, fifth and sixth shift elements are engaged or transfer torque. In the fifth forward gear, the second, third, fourth and fifth shift elements are engaged or transfer torque. In the sixth forward gear, the second, third, fourth and sixth shift elements are engaged or transfer torque. In the seventh forward gear, the third, fourth, fifth and sixth shift elements are engaged or transfer torque. In the eighth forward gear, the first, third, fourth and sixth shift elements are engaged or transfer torque. In the ninth forward gear, the first, fourth, fifth and sixth shift elements are engaged or transfer torque. In the reverse gear, the first, second, fourth and sixth shift elements are engaged or transfer torque.

If there is an additional seventh shift element, in contrast to the exemplary design of the transmission with only six shift elements, an additional forward gear can be realized under the first gear of the design of the transmission with only six shift elements, thus an additional forward gear with a transmission ratio greater than that of the transmission ratio of the first gear of the exemplary design of the transmission with only six shift elements. Thus, this additional forward gear is particularly well-suited as a so-called "crawler," with a smaller overall transmission ratio for a large pulling force. As in shifting logic or gear logic, it can be provided that, in such an additional forward gear, the first, second, sixth and seventh shift elements are engaged or transfer torque, while, in all other forward gears and in the reverse gear, the seventh shift element is engaged or transfers torque.

If the sixth shift element is formed as a positive-locking clutch, it is advantageous if upon an upshift from a forward gear, in which the sixth shift element does not lead the torque, into a target gear that is next higher from the gear step, in which the sixth shift element leads the torque a downshift is initially carried out into the forward gear next lower from the gear step and a direct shift is subsequently carried out into the target gear. Advantageously, comfort problems, which may occur during an upshift with a switched-on positive-locking shift element, are avoided, since this direct shift is a simple crossover shift with one switched-off frictional-locking shift element and one switched-on frictional-locking shift element.

With respect to the spatial arrangement of the four planetary gear sets in the housing of the automatic transmission, it is proposed in one exemplary embodiment to arrange all four planetary gear sets coaxially next to each other in the defined order of "first, fourth, second, third planetary gear set," by which it is possible to, in a simple manner and with minimum leakage, supply all clutches with the means of pressure necessary for hydraulic actuation. For an application with a drive shaft and an output shaft that pass coaxially to each other, it is useful that the first planetary gear set is the planetary gear set of the planetary gear set group turned towards the input of the automatic transmission. In another exemplary embodiment, with respect to the spatial arrangement of the four planetary gear sets in the housing of the automatic transmission, it is proposed to arrange all four planetary gear sets coaxially next to each other in the defined order of "second, fourth, first, third planetary gear set," whereas, in this case, for an application in a vehicle with so-called "standard drive," it is suitable to be turned towards the second planetary gear set of the drive side of the automatic transmission, while, for an application in a vehicle with a so-called "front-transverse drive," it is suitable to be turned towards the third planetary gear set of the drive side of the automatic transmission.

In practice, all proposed designs and arrangements for an automatic transmission in accordance with exemplary aspects of the invention have, in particular for passenger cars, useful transmission ratios with very large overall spreads in terms of the gear gradation that are reasonable for drivability, which has positive effects on the intended low consumption of fuel. In addition, the automatic transmission in accordance with exemplary aspects of the invention is characterized by the number of gears, a low number of shift elements and comparatively low construction costs. Furthermore, with the automatic transmission in accordance with exemplary aspects of the invention, a good degree of efficiency arises in all gears; on the one hand, this is a consequence of low drag losses, since four of the shift elements always mesh in each gear; on the other hand, this is also the consequence of low gearing losses in the simply structured individual planetary gear sets.

In an advantageous manner, with the automatic transmission in accordance with exemplary aspects of the invention, it is possible to realize a start-up of the motor vehicle both with a start-up element external to the transmission and with a frictional shift element internal to the transmission. In a manner known per se, a start-up element external to the transmission may be formed as a hydrodynamic converter, as a so-called "dry start-up clutch," as a so-called "wet start-up clutch," as a magnetic powder clutch or as a centrifugal clutch. As an alternative to the arrangement of such a start-up element in the power flow between the drive motor and the transmission, the start-up element external to the transmission may also be arranged in the power flow behind the transmission, whereas, in this case, the drive shaft of the transmission is constantly connected to the crank shaft of the drive motor in a torsion-proof or torsionally flexible manner. On the one hand, the two brakes, in particular that brake that is actuated in the forward gears one to six and in the reverse gear, on the other hand, that clutch that is actuated in the forward gears one to four and in the reverse gear, are suitable, for example, as the start-up element internal to the transmission.

In addition, the automatic transmission in accordance with exemplary aspects of the invention is designed to enable adaptability to the various drive train arrangements both in the direction of the power flow and in spatial terms. Thus, with the same transmission diagram, depending on the stationary transmission ratio of the individual planetary gear sets, various gear jumps arise, such that an application-specific or vehicle-specific variation is made possible. Furthermore, without any special structural measures, it is possible to arrange the input and the output of the transmission either coaxially to each other or axially parallel to each other. An axle differential and/or a distributor differential may be arranged on the input side or on the output side of the transmission. It is also possible to provide additional freewheels at each suitable point of the multi-speed transmission, in particular by forming, if applicable, a connection between one shaft and the housing or by two shafts. Moreover, a wear-free brake such as a hydraulic or electric retarder or the like may be arranged at each shaft, preferably at the drive shaft or at the output shaft; this is of particular importance for use in commercial vehicles. Moreover, a power take-off may be provided for the drive of additional power units at each shaft, preferably at the drive shaft or the output shaft. An additional advantage of the automatic transmission in accordance with exemplary aspects of the invention is that an electric motor can be installed at each shaft as a generator and/or as an additional drive motor.

The shift elements that are used may be formed as power-shifting clutches or brakes. In particular, force-fitting clutches or brakes, such as multi-disk clutches, band brakes and/or cone clutches, may be used. Moreover, positive-locking brakes and/or clutches, such as synchronizations or claw couplings, may be used as shift elements.

BRIEF DESCRIPTION OF THE DRAWINGS

Preferred additional forms of the invention arise from the sub-claims and the following description. Embodiments of the invention are, without any limitation, described in more detail through the drawing. Thereby, the following is shown:

FIG. 2 is an exemplary shifting diagram for the transmission in accordance with FIG. 1;

FIG. 3 shows the shifting diagram in accordance with FIG. 2 with modified stationary transmission ratios compared to FIG. 2;

FIG. 5 is a schematic presentation of a third embodiment of an automatic transmission in accordance with exemplary aspects of the invention;

FIG. 6 is an exemplary detailed design (transmission section) of the transmission in accordance with FIG. 5;

FIG. 7 shows the detailed design of FIG. 6 with a marked scope of modifications compared to a series transmission derived from DE 10 2005 002 337 A1;

FIG. 9 is an exemplary detailed design (transmission section) of the transmission in accordance with FIG. 8;

FIG. 10 is a table with combinations of types of planetary gear sets, derived from the transmission in accordance with FIG. 1;

FIG. 15 is an exemplary shifting diagram for the transmission in accordance with FIG. 14;

FIG. 16 is a table with combinations of types of planetary gear sets, derived from the transmission in accordance with FIG. 14;

FIG. 17 is a schematic presentation of a ninth embodiment of an automatic transmission in accordance with exemplary aspects of the invention, with one positive planetary gear set and three negative planetary gear sets; and FIG. 18 is a schematic presentation of a tenth embodiment of an automatic transmission in accordance with exemplary aspects of the invention, with one positive planetary gear set and three negative planetary gear sets.

DETAILED DESCRIPTION

Figure 1:
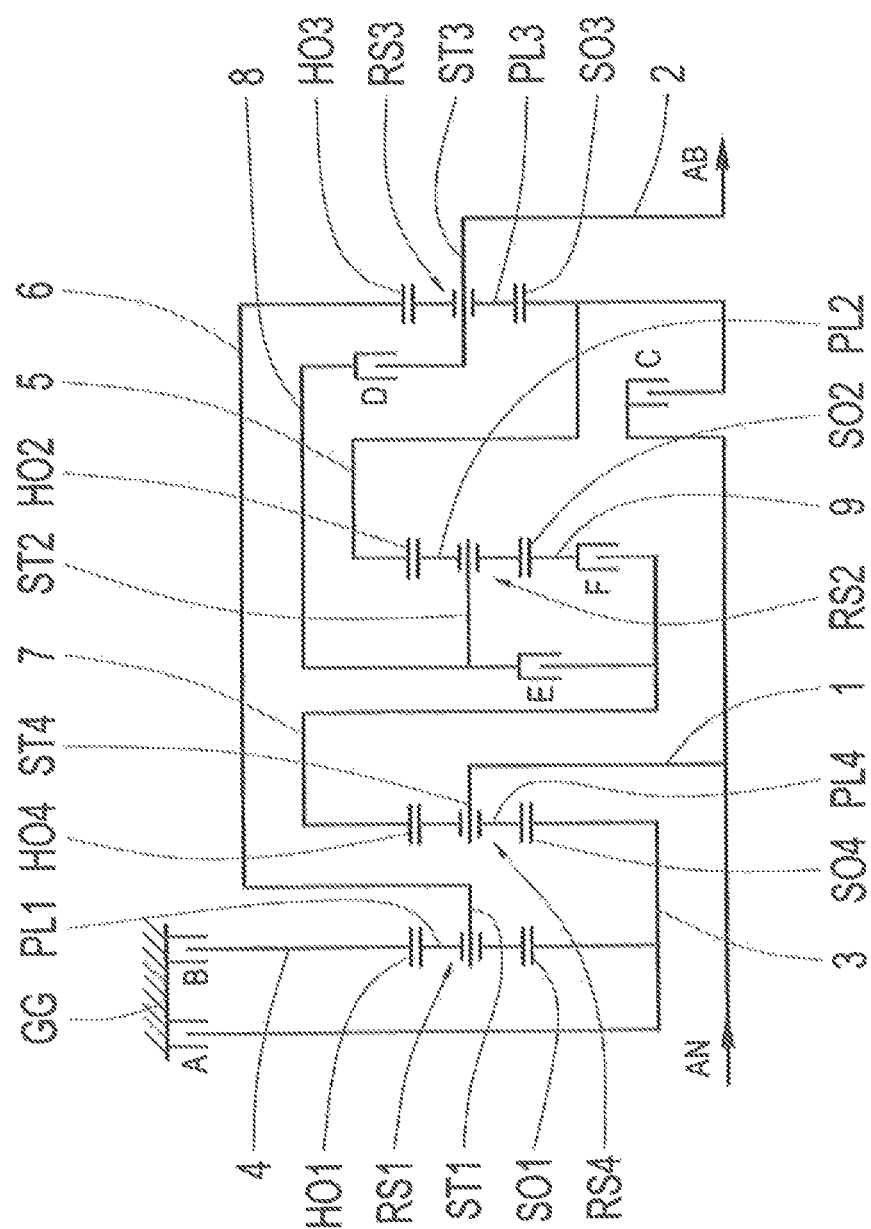
FIG. 1 is a schematic presentation of a first embodiment of an automatic transmission in accordance with exemplary aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIG. 1, the gear set diagram of a 9-gear automatic transmission is presented as the first embodiment of an automatic transmission in accordance with exemplary aspects of the invention. The transmission comprises one drive shaft AN, one output shaft AB, four planetary gear sets RS1, RS2, RS3, RS4 and six shift elements A, B, C, D, E, F, all of which are arranged in a housing GG of the transmission. All four planetary gear sets RS1, RS2, RS3, RS4 are formed as simple negative planetary gear sets. As is well-known, a negative planetary gear features planetary gears that mesh with the sun gear and ring gear of the planetary set. The ring gears of the four planetary gear sets RS1, RS2, RS3, RS4 are designated with HO1, HO2, HO3 and HO4, the sun gears are designated with SO1, SO2, SO3 and SO4, the planetary gears are designated with PL1, PL2, PL3 and PL4, and the planetary gear carriers, to which the specified planetary gears are rotatably mounted, are designated with ST1, ST2, ST3 and ST4.

Accordingly, each of the four planetary gear sets RS1, RS2, RS3, RS4 comprises a first, a second and a third element, whereas, in the exemplary embodiment shown in FIG. 1, all of the first elements of the four planetary gear sets are formed as sun gears, all of the second elements of the four planetary gear sets are formed as planetary gear carriers, and all of the third elements of the four planetary gear sets are formed as ring gears.

Including the drive shaft AN and the output shaft AB, the automatic transmission in accordance with exemplary aspects of the invention features a total of nine rotating shafts, which are designated with 1 to 9.

The shift elements A and B are formed as brakes, which in the exemplary embodiment shown are designed as frictional-locking, shiftable multi-disk brakes, and may also be designed in another arrangement as frictional-locking, shiftable band brakes or, for example, as positive-locking, shiftable claw brakes or cone brakes. The shift elements C, D, E and F are formed as clutches, which in the exemplary embodiment shown are all designed as frictional-locking, shiftable multi-disk clutches, and may also be designed in another arrangement, for example, as positive-locking, shiftable claw couplings or cone clutches. With this total of six shift elements A to F, a selective shifting of nine forward gears and one reverse gear can be realized, which will be described in more detail below on the basis of FIG. 2.

With respect to the coupling of the individual elements of the four planetary gear sets RS1, RS2, RS3 RS4 to each other, and to the drive shaft and output shaft AN, AB, with the exemplary embodiment in accordance with FIG. 1, the following is provided: the planetary gear carrier ST4 of the fourth planetary gear set RS4 and the drive shaft AN are connected to each other in a torsion-proof or torsionally flexible manner and form the first shaft of the automatic transmission, designated with 1. The planetary gear carrier ST3 of the third planetary gear set RS3 and the output shaft AB are connected to each other in a torque-proof or torsionally flexible manner and form the second shaft of the automatic transmission, designated with 2. The sun gear SO1 of the first planetary gear set RS1 and the sun gear SO4 of the fourth planetary gear set RS4 are connected to each other in a torque-proof or torsionally flexible manner, and form the third shaft—also called the "first clutch shaft"—of the automatic transmission, designated with 3. The ring gear HO1 of the first planetary gear set RS1 forms the fourth shaft of the automatic transmission, designated with 4. The ring gear HO2 of the second planetary gear set RS2 and the sun gear SO3 of the third planetary gear set RS3 are connected to each other in a torque-proof or torsionally flexible manner, and form the fifth shaft—also called the "second clutch shaft"—of the automatic transmission, designated with 5. The planetary gear carrier ST1 of the first planetary gear set RS1 and the ring gear HO3 of the third planetary gear set RS3 are connected to each other in a torque-proof or torsionally flexible manner, and form the sixth shaft—also called the "third clutch shaft"—of the automatic transmission, designated with 6. The ring gear HO4 of the fourth planetary gear set RS4 forms the seventh shaft of the automatic transmission, designated with 7. The planetary gear carrier ST2 of the second planetary gear set RS2 forms the eighth shaft of the automatic transmission, designated with 8. The sun gear SO2 of the second planetary gear set RS2 forms the ninth shaft of the automatic transmission, designated with 9.

With respect to the coupling of the six shift elements A to F to the described shafts 1 through 9 of the transmission and to the transmission housing GG, with the automatic transmission in accordance with exemplary aspects of the invention shown in FIG. 1, the following is provided: the first shift element A is arranged in the power flow between the third shaft 3 and the transmission housing GG. The second shift element B is arranged in the power flow between the fourth shaft 4 and the transmission housing GG. The third shift element C is arranged in the power flow between the fifth shaft 5 and the first shaft 1. The fourth shift element D is arranged in the power flow between the eighth shaft 8 and the second shaft 2. The fifth shift element E is arranged in the power flow between the seventh shaft 7 and the eighth shaft 8. The sixth shift element F is finally arranged in the power flow between the seventh shaft 7 and the ninth shaft 9.

In the exemplary embodiment shown in FIG. 1, the four planetary gear sets RS1, RS2, RS3, RS4 are arranged, viewed in an axial direction, coaxially one behind the other in the defined order of "RS1, RS4, RS2, RS3," whereas the drive shaft AN and the output shaft AB are arranged coaxially to each other, and the first planetary gear set RS1 forms the gear set of the automatic transmission close to the drive and the third planetary gear set RS3 forms the gear set of the transmission close to the output. In an advantageous manner, such arrangement of "RS1, RS4, RS2, RS3" enables each of the three planetary gear sets RS1, RS2, RS4 to be reached through centrically in an axial direction only by one shaft of the automatic transmission.

In principle, the spatial arrangement of the shift elements within the transmission is arbitrary, and is limited only by the dimensions and the external shaping of the transmission housing GG. Accordingly, the arrangement of components shown in FIG. 1 is expressly understood to be just one of many variants of the arrangement of the components. The specialist can find numerous suggestions for this in, for example, the aforementioned document DE 10 2005 002 337 A1 and DE 10 2007 055 808 A1. Due to the narrow housing structure, the exemplary embodiment shown in FIG. 1 is particularly well-suited for installation in a motor vehicle with a so-called "standard drive." The arrangement of components shown in FIG. 1 is based on the automatic transmission disclosed in FIG. 4 of DE 10 2005 002 337 A1.

As shown in FIG. 1, the two planetary gear sets RS1 and RS4 are directly adjacent to each other. In the exemplary embodiment shown, the two brakes A, B are arranged, viewed spatially, axially next to each other in an area radially above the planetary gear set RS1 close to the drive, the brake B is arranged essentially radially above the first planetary gear set RS1. Thereby, as an example, the multi-disk packs of these two brakes A, B feature at least a similar diameter. In a structurally simple manner, the brake A may also be integrated into a housing wall of the transmission housing GG close to the drive. As already indicated, the spatial arrangement of the two brakes A, B shown in FIG. 1 is understood as an example. Thus, for saving axial installation length of the transmission in a different arrangement, it may be provided, for example, that, with unchanged multi-disk packs arranged axially next to each other, the brake A is arranged, at least partially, in an area radially above the first planetary gear set RS1, and the brake B is arranged, at least partially, in an area radially above the fourth planetary gear set RS4. In yet another arrangement, it may be provided, for example, that the two brakes A, B are not arranged axially next to each other, but are arranged partially radially above each other or completely radially above each other.

As is also shown in FIG. 1, the two clutches C and D are arranged, viewed spatially, in an area axially between the second planetary gear set RS2 adjacent to the fourth planetary gear set RS4 and the third planetary gear set RS3 close to the output. The multi-disk pack of the clutch D is arranged, viewed spatially, approximately radially above the multi-disk pack of the clutch C, by which the two clutches C and D axially border the third planetary gear set RS3 (on its side turned towards the second planetary gear set RS2). Thereby, the shaft 5, which forms the operative connection between the ring gear HO2 of the second planetary gear set RS2 and the sun gear SO3 of the third planetary gear set RS3, completely encompasses the clutch C in an axial direction, by which the clutch C is arranged within a cylinder space that is formed by the shaft 5. Furthermore, the shaft 8, which forms the operative connection between the planetary gear carrier ST2 of the second planetary gear set RS2 and the clutch D, completely encompasses the second planetary gear set RS2 and the clutch E in an axial direction. As already indicated, the spatial arrangement of the two clutches C and D shown in FIG. 1 is understood as an example. Thus, depending on the installation space available for the installation of the transmission in the vehicle, it may be suitable to arrange the clutches C and D axially next to each other, whereas the clutch D is arranged closer to the third planetary gear set RS3 than the clutch C, and the multi-disk packs of the two clutches C and D may be arranged at large diameters that are at least similar.

As also shown in FIG. 1, the two clutches E and F are arranged, viewed spatially, adjacent to the second planetary gear set RS2. Thereby, the clutch E provided in the power flow between the planetary gear carrier ST2 of the planetary gear set RS2 and the ring gear HO4 of the planetary gear set RS4 is arranged, viewed spatially, in an area axially between the second planetary gear set RS2 and the fourth planetary gear set RS4, while the clutch F, which is open only in the fifth forward gear and is engaged in all other gears and is thus is particularly well suited to be carried out in the type of a claw coupling, is arranged, viewed spatially, in the area centrally within the sun gear SO2 of the second planetary gear set RS2. Moreover, for the spatial arrangement of the two clutches E and F, reference must be made here to the exemplary nature of the presentation selected in FIG. 1. Of course, the specialist can otherwise spatially place the two clutches E, F, in particular if the clutch F is formed as a multi-disk clutch with larger plate diameters. For example, the clutch E may also be arranged on the side of the planetary gear set RS2 turned towards the planetary gear set RS3. Moreover, the clutch F may be arranged on both sides, axially next to the planetary gear set RS2, optionally axially next to or radially below the clutch E.

As also shown in FIG. 1, each of the planetary gear sets RS1, RS4 and RS3 is centrally penetrated, in an axial direction, at most by one shaft of the transmission. Specifically, the planetary gear sets RS1 and RS4 are completely penetrated centrally, in an axial direction, only by the drive shaft AN or the shaft 1, whereas the drive shaft AN, in its axial course, centrally penetrates the third shaft 3, the seventh shaft 7 and a section of the fifth shaft 5. This is particularly advantageous, on the one hand, for the dimensioning of the drive shaft AN and the gear sets, and, on the other hand, for the comparatively simple supply of lubricant to the planetary gears of the four planetary gear sets RS1 to RS4 and for the comparatively simple supply of pressure and lubricant to the four clutches E, F, D, C. Depending on the spatial position of the clutch F, it may be that the second planetary gear set RS2 is completely penetrated centrally, in an axial direction, only by one shaft—in this case, by the drive shaft AN or the shaft 1.

As also shown in FIG. 1, the shaft 6 of the transmission, which forms the operative connection between the planetary gear carrier ST1 of the first planetary gear set RS1 and the ring gear HO3 of the third planetary gear set RS3, in its axial course, completely overlaps the fourth and second planetary gear sets RS4, RS2, and the four clutches E, F, C, D.

FIG. 2 shows an exemplary shifting diagram of the 9-gear automatic transmission in accordance with exemplary aspects of the invention shown in FIG. 1. In each gear, four shift elements are engaged and two shift elements are open. In addition to the shifting logic, exemplary values for the respective transmission ratios i of the individual gear steps and the progressive steps phi to be determined from them can be seen in the shifting diagram. The specified transmission ratios i arise from the (typical) stationary transmission ratios of the four planetary gear sets RS1, RS4, RS2, RS3 of negative 2.00; negative 1.70; negative 1.61 and negative 4.30. Furthermore, it can be seen from the shifting diagram that, upon a sequential shifting operation—thus, upon upshifts and downshifts by one gear—double gearshifts and group gearshifts can be avoided, since two gears adjacent in the shifting logic always jointly use two shift elements. The seventh forward gear is formed as a direct gear.

Therefore, the calculated degree of efficiency of the 9-gear automatic transmission shown in FIGS. 1 and 2 is particularly good, since, in each gear, only two of the six shift elements are not in mesh, and thereby the compulsory drag losses at the opened frictional shift elements are effectively minimized. Typical values for the calculated degree of efficiency for the transmission is 98.4% in first gear, 97.7% in second gear, 98.8% in third gear, 98.6% in fourth gear, 98.9% in the fifth and sixth gears, 100% in seventh gear, 99.4% in the eighth gear and 99.2% in the ninth gear.

The use of other stationary transmission ratios of the individual planetary transmission result in the individual gear steps of other transmission ratios. An example of this is shown in FIG. 3, using the shifting diagram indicated in FIG. 2. The transmission ratios i of the progressive steps phi indicated in FIG. 3 are, for the four planetary gear sets RS1, RS4, RS2, RS3, subject to the stationary transmission ratios of negative 2.0, negative 1.70, negative 1.61 and negative 4.50.

Figure 4:
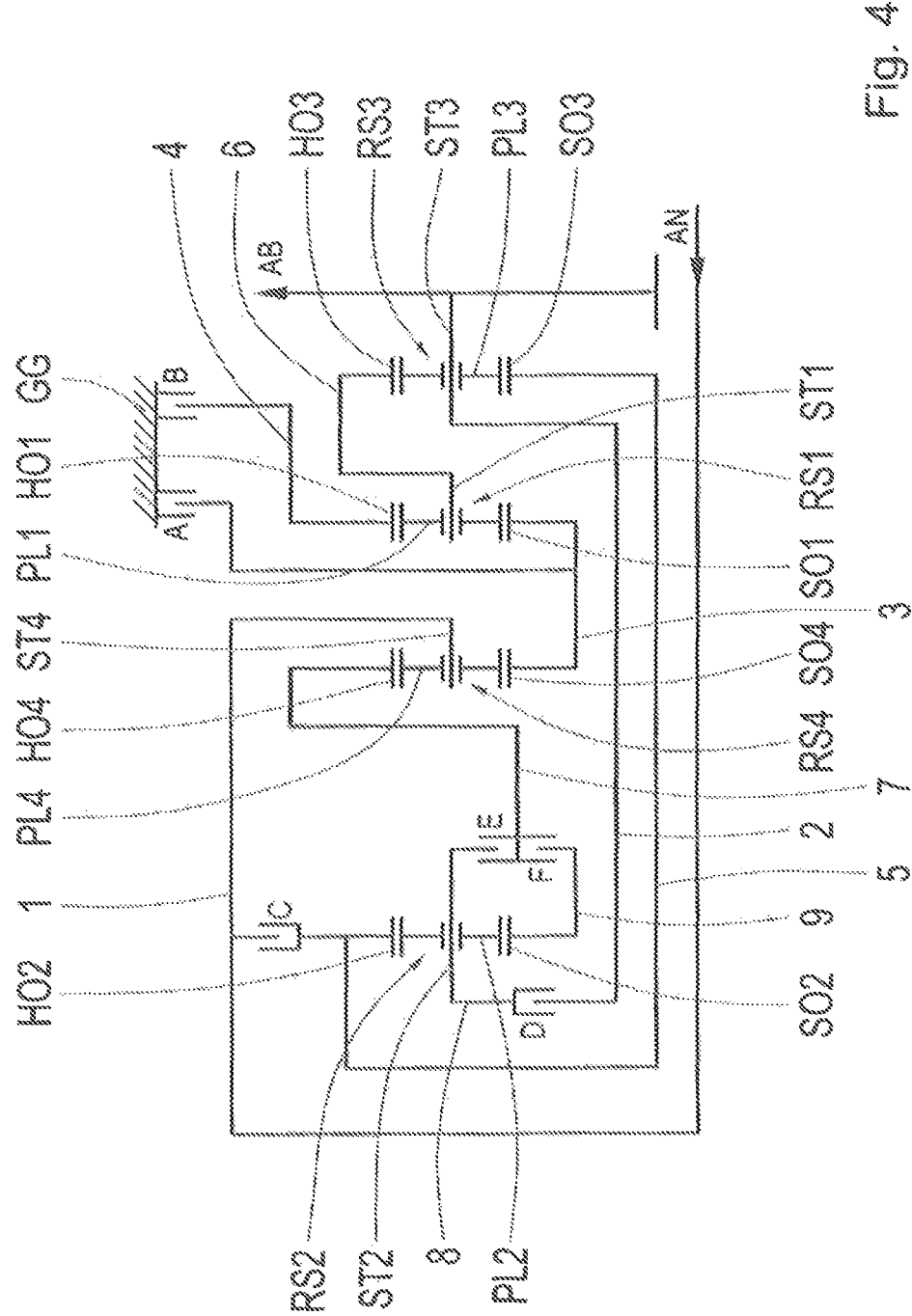
FIG. 4 is a schematic presentation of a second embodiment of an automatic transmission in accordance with exemplary aspects of the invention.

FIG. 4 shows a second embodiment of an automatic transmission in accordance with exemplary aspects of the invention. The gear set diagram shown here of a 9-gear automatic transmission corresponds to the kinematics of the gear set diagram of FIG. 1, but with a modified spatial arrangement of the four planetary gear sets RS1, RS2, RS3, RS4 and six shift elements A, B, C, D, E, F.

Viewed spatially, in FIG. 4, the order of the four individual planetary gear sets, arranged coaxially next to each other, is changed compared to FIG. 1 to the effect that a defined order of "second, fourth, first, third planetary"—thus, an arrangement of "RS2-RS4-RS1-RS3"—arises. Thereby, the second planetary gear set RS2 is, by way of example, turned towards the drive side of the automatic transmission. This also results in a different spatial arrangement of the shift elements within the transmission housing GG. Thus, the two brakes A and B are located, by way of example, in an area radially above the planetary gear sets RS1 and RS3, the three clutches C, E and F are located, by way of example, in an area axially between the planetary gear sets RS2 and RS4, and the clutch D is located, by way of example, at the side of the planetary gear set RS2 turned away from the planetary gear set RS4.

In FIG. 4, the suitability of this arrangement for use in a vehicle with a so-called "front-transverse drive" is likewise indicated, by the third planetary gear set RS3, by way of example, being turned towards the drive side of the automatic transmission.

FIG. 5 shows a third embodiment of an automatic transmission in accordance with exemplary aspects of the invention. The gear set diagram shown here of a 9-gear automatic transmission corresponds to the kinematics of the gear set diagram of FIG. 1, but with a modified spatial arrangement of the shift elements. Viewed spatially, the sequence of the four individual planetary gear sets, arranged coaxially next to each other, of "first, fourth, second, third planetary gear," thus the arrangement of "RS1-RS4-RS2-RS3" as in FIG. 1, is unchanged, whereas the first planetary gear set RS1 is in turn, by way of example, turned towards the drive side of the automatic transmission.

Compared to FIG. 1, on the one hand, the spatial arrangement of the clutches C and D in the area axially between the two planetary gear sets RS2 and RS3 is modified. Now, the clutches C and D are spatially arranged axially next to each another, whereas the clutch C applicable as the third shift element axially directly borders the second planetary gear set RS2 and the clutch D applicable as the fourth shift element axially directly borders the third planetary gear set RS3. On the other hand, the two clutches E and F are now arranged, viewed spatially, in the area axially between the two planetary gear sets RS4 and RS2, whereas the friction element (indicated here, for example, as a multi-disk pack) of the clutch E applicable as the fifth shift element is arranged radially above the friction element (indicated here, for example, as a multi-disk pack) of the clutch F applicable as the sixth shift element.

Figure 6A:
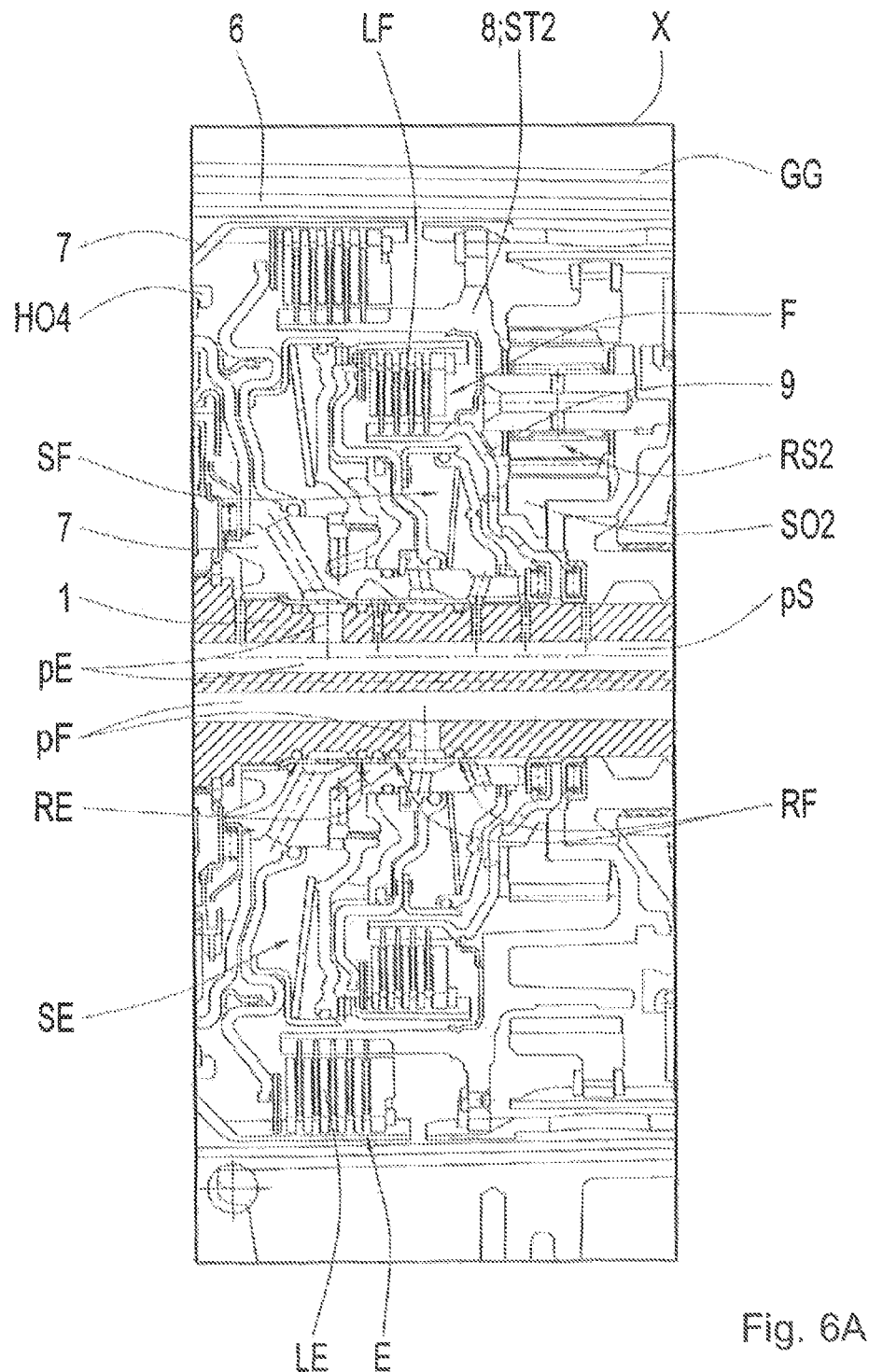
FIG. 6A is a transmission section detail from FIG. 6.

FIG. 6 shows a transmission section of a detailed design of an exemplary embodiment for the transmission diagram shown in FIG. 5. FIG. 6A shows an enlarged detailed section of this transmission section.

Generally, an additional forward gear for an automatic transmission, that is otherwise well-known, results in significant customer benefits only if the benefit from the possible shifting of the operating point in the engine characteristic map of the motor vehicle from the additional gear is greater than the additional losses in the automatic transmission caused by the at least one additional shift element, provided that the necessary scope of modifications is economically tolerable compared to the basic transmission. Based on this consideration and based on the actual structure of the known "8HP70" 8-gear automatic transmission of the applicant derived from DE 10 2005 002 337 A1, the transmission in accordance with exemplary aspects of the invention proposed in FIG. 6 is subject to the task of a finding a clutch arrangement for the gear set in accordance with exemplary aspects of the invention, which, compared to the basic transmission, on the one hand causes extremely low additional losses, and, on the other hand, permits the use of as many common parts as possible and as many of the same manufacturing processes as possible, and if possible can be installed in the available installation space.

According to the gear set in accordance with exemplary aspects of the invention with the clutch F in the power flow between the shaft 7 (ring gear HO4 of the fourth planetary gear set RS4) and the shaft 9 (sun gear SO2 of the second planetary gear set RS2) and the clutch E in the power flow between the shaft 7 (ring gear HO4 of the fourth planetary gear set RS4) and the shaft 8 (bar ST2 of the second planetary gear set RS2), there are four options for the arrangement of the servomechanisms provided for the hydraulic actuation of the two clutches E and F:

1. Servomechanism of clutch E at shaft 7 and servomechanism of clutch F at shaft 7
2. Servomechanism of clutch E at shaft 7 and servomechanism of clutch F at shaft 9
3. Servomechanism of clutch E at shaft 8 and servomechanism of clutch F at shaft 9
4. Servomechanism of clutch E at shaft 8 and servomechanism of clutch F at shaft 7

Only the first of the four arrangements enables, compared to the basic transmission, a minimization of the unavoidable additional transmission losses through leakage and friction in the area of the pressure medium supply line to the additional sixth shift element. Solely with arrangement one is it specifically possible to guide the pressure medium supply line at the servomechanisms of the two clutches E and F, coming from the drive shaft, with solely three equally sized plain compression rings of the same diameter up to the pressure chambers of the two servomechanisms. In addition, these three plain compression rings are placed on the outside diameter of the drive shaft, thus at the smallest possible diameter of a pressure medium supply line in the transmission, which minimizes the friction losses that arise on the plain compression rings upon rotation with the relative rotational speed between their running surfaces. As an alternative to the arrangement with three equally sized plain compression rings of the same diameter, four equally sized plain compression rings of the same diameter can be used, with the advantage that, at the two rotating pressure medium transfer points, which are arranged axially directly next to each other, a possible reciprocal pressure influence is effectively prevented, by the leakage oil accruing at the two axially center plain compression rings being discharged without pressure between the two center plain compression rings.

In order to achieve this, in the detailed design proposed in FIG. 6, the two clutches E are combined into one assembly, which is arranged, viewed spatially, in an area axially between the fourth and second planetary gear sets RS4, RS2, whereas a friction element LE of the clutch E, formed by way of example as a multi-disk pack, is arranged radially above a friction element LF of the clutch F, formed by way of example as a multi-disk pack. This placement, relative to the basic transmission, of the clutch F radially within the clutch E, the dimensioning of which is essentially taken from the basic transmission, enables the arrangement of the multi-disks of the clutch F in the smallest possible diameter, which has a positive effect on the drag losses of the clutch F in the open state.

The outer multi-disk carrier of the radially outer clutch E is directly connected in a torque-proof manner to the ring gear HO4 of the fourth planetary gear set RS4 and forms a section of the shaft 7. Another section of the shaft 7 forms a hub extending axially in the direction of the second planetary gear set, which is likewise connected in a torque-proof manner to the ring gear HO4 of the fourth planetary gear set RS4, but is also connected in a torque-proof manner to the outer multi-disk carrier of the radially inner clutch F. The inner multi-disk carrier of the radially outer clutch E forms a section of the shaft 8 and is connected in a torque-proof manner to the planetary gear carrier ST2 of the second planetary gear set RS2 and the inner multi-disk carrier of the clutch D. In the exemplary embodiment presented here, the inner multi-disk carrier of the clutch E and the planetary gear carrier ST2 are carried out as one piece. The inner multi-disk carrier of the radially inner clutch F forms a section of the shaft 9 and is connected in a torque-proof manner to the sun gear SO2 of the second planetary gear set RS2. The transmission section detail designated in FIG. 6A with X is enlarged in FIG. 6A.

In an advantageous manner in terms of production technology, compared to the basic transmission, this new E/F assembly does not change the fourth planetary gear set RS4 bordering it, since the interface at the ring gear HO4 provided at the basic transmission for the direct coupling at the sun gear SO2 of the second planetary gear set RS2 is also suitable for the coupling of the two new outer multi-disk carriers of the clutches E and F.

The electro-hydraulic control device HSG guides the pressure medium provided by a transmission pump PU, in line with demand, to the individual six shift elements A to F. In FIGS. 6/6A, the pressure medium supply lines pC, pD, pE and pF are marked at the four clutches C, D, E and F. The servomechanism SC of the clutch C is supplied with pressure medium by the output shaft AB. The servomechanisms SD, SE and SF of the other three clutches D, E and F are supplied with pressure medium by the drive shaft AN. In terms of structure, the servomechanisms SC, SD, SE and SF are carried out, in a known manner, with one pressure chamber (not more specifically labeled in the figure) and one pressure equalization chamber (not more specifically labeled in the figure) provided for the compensation of the rotational pressure prevailing in the respective pressure chamber. These pressure equalization chambers of the servomechanisms SC, SD, SE and SF are filled with lubricant without pressure, which is supplied from the drive shaft AN through the lubricant supply line pS. In addition, in a known manner, the lubricant supply line pS also supplies the lubrication points in the transmission.

In FIG. 6/6A, it can be seen that both the servomechanism SE provided for actuating the friction element LE of the clutch E and the servomechanism SF provided for actuating the friction element LF of the clutch F are incorporated in a hub-shaped section of the shaft 7 connected in a torque-proof manner to the ring gear HO4 of the fourth planetary gear set RS4. Thus, the ring gear HO4, the servomechanism SE and the servomechanism SF constantly rotate with the same rotational speed. In the exemplary embodiment shown here, the servomechanism SF is arranged, viewed spatially, axially directly next to the servomechanism SE, an arrangement that has proven to be optimal for the installation space specified by the basic transmission. Alternatively, in a different design, it can be provided, by way of example, that the servomechanism SE allocated to the radially outer friction element LE is arranged, viewed spatially, essentially radially above the servomechanism SF allocated to the radially inner friction element LF.

For sealing the rotating pressure medium transfer point between the drive shaft AN and the hub-shaped section of the shaft 7, in the exemplary embodiment shown in FIG. 6/6A, the aforementioned variant is realized with four equally sized plain compression rings of the same diameter. In FIG. 6A, the two plain compression rings allocated to the pressure medium supply line pE are designated with RE and the two plain compression rings allocated to the pressure medium supply line pF are designated with RF.

FIG. 7 finally shows the detailed design of FIG. 6, in which the scope of modifications compared to the "8HP70" series transmission of the applicant derived from DE 10 2005 002 337 A1 is marked in hatching. It can be easily seen that, when applying the technical method in accordance with exemplary aspects of the invention, only very few changes on the component side are necessary to further develop the known "8HP70" 8-gear automatic transmission into a 9-gear automatic transmission, such that the necessary additional production-side investments in industrialization are extremely low. It can also be easily seen that, in a particularly advantageous manner, the additional sixth shift element compared to the "8HP70" 8-gear automatic transmission does not result in an enlargement of the given transmission housing; despite the additional gear, the further development in accordance with exemplary aspects of the invention can be presented in a manner neutral to installation space, and the transmission housing GG is unchanged compared to the basic transmission.

In the area of the interfaces of the new E/F assembly at the other transmission elements, comparatively few and structurally simple changes are required compared to the basic transmission. The shaft 6 formed as a cup-shaped cylinder is unchanged from the basic transmission. The ring gear HO4 of the fourth planetary gear set RS4 is unchanged from the basic transmission. The combination of inner multi-disk carrier E/planetary gear carrier ST2, forming a section of the shaft, is a new part. The cylindrical inner multi-disk carrier of the clutch D, forming another section of the shaft 8, is axially shorter compared to the basic transmission. The cylindrical outer multi-disk carrier of the clutch C, forming a section of the shaft 5, is also axially shorter compared to the basic transmission. The hub section close to the sun gear SO2 of the inner multi-disk carrier of the clutch C forming a section of the shaft 1 is slightly adjusted in order to enable the mounting of the inner multi-disk carrier of the additional clutch F compared to the basic transmission. The hub suspended in the ring gear HO4 and forming a section of the shaft 7, with an outer multi-disk carrier of the clutch E and an outer multi-disk carrier of the clutch F, is a new part. The servomechanisms of the two clutches E and F are also new parts. The inner multi-disk carrier of the additional clutch F forming a section of the shaft 9, is a new part compared to the basic transmission; the sun gear SO2 connected to this inner multi-disk carrier and forming another section of the shaft 9 is modified in the area of this coupling compared to the basic transmission.

Due to the additional shift element compared to the basic transmission, a new design of the electro-hydraulic control device HSG is required; in doing so, however, numerous elements of the basic control device can be used.

In terms of production technology, the modular capability of the new transmission concept is particularly advantageous. From the 9-gear automatic transmission proposed in FIG. 6, an 8-gear automatic transmission can be derived in a very simple manner. As already stated above, the design of the ring gear HO4 of the fourth planetary gear set RS4 provided in FIG. 6 is also suitable for the direct coupling to the sun gear SO2 of the second planetary gear set RS2, such that the omission of the clutch F in favor of the coupling of the ring gear HO4 and of the outer multi-disk carrier of the clutch E without any modification to the ring gear HO4, now directly at the sun gear SO2, requires only a modified hub of the shaft 7 and a modified sun gear SO2. The drive shaft 1 may be used as a common part, despite the boring for the pressure medium supply line Pf, which is no longer necessary in the 8-gear automatic transmission. The control device known from the "8HP70" basic transmission is suitable as the electro-hydraulic control device HSG for the 8-gear variant.

Figure 8:
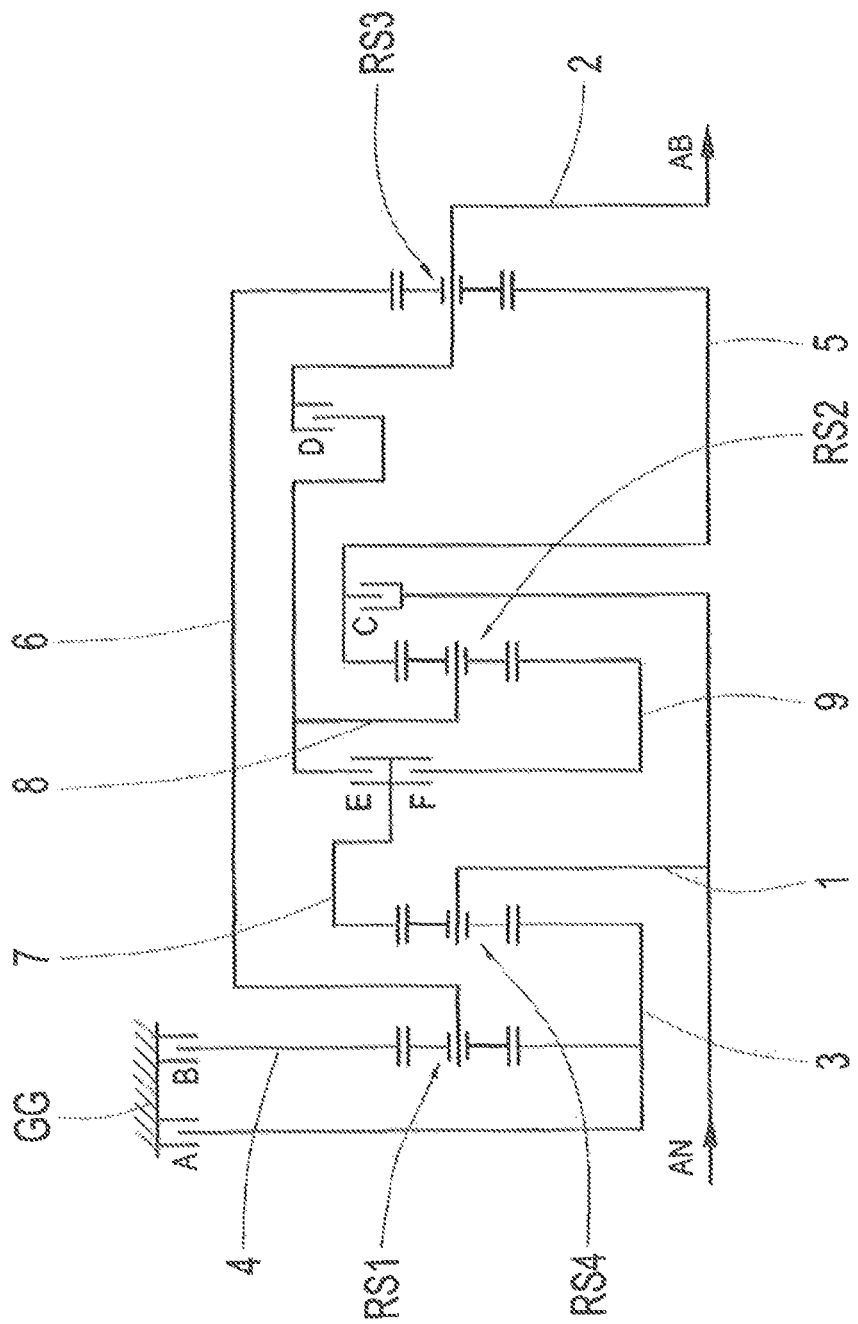
FIG. 8 is a schematic presentation of a fourth embodiment of an automatic transmission in accordance with exemplary aspects of the invention.

FIG. 8 shows a fourth embodiment of an automatic transmission in accordance with exemplary aspects of the invention. The gear set diagram shown here of a 9-gear automatic transmission corresponds to the kinematics of the gear set diagram of FIG. 1 and is similar to the gear set diagram of FIG. 5. However, in contrast to FIG. 5, it is provided in FIG. 8 that the seventh shaft 7 is connected to the inner multi-disk carrier of the multi-disk clutch E and to the outer multi-disk carrier of the multi-disk clutch F. Accordingly, the outer multi-disk carrier of the multi-disk clutch E is now connected to the eighth shaft 8, while the inner multi-disk carrier of the multi-disk clutch F is now connected to the ninth shaft 9. For the clutches E, F, this structural design enables a common multi-disk carrier, which incorporates the inner multi-disks of the clutch E, a servomechanism for engaging the multi-disk pack of the (radially outer) clutch E (which is not shown more specifically here), the outer multi-disks of the clutch F and a servomechanism for engaging the multi-disk pack of the (radially inner) clutch F (which is not shown more specifically here). In a particularly advantageous manner, this structural design enables a space-saving interlaced arrangement of the clutches E and F, along with a supply of pressure medium and lubricant to all shift elements with minimum leakage loss, which will be explained in more detail below.

Figure 9A:
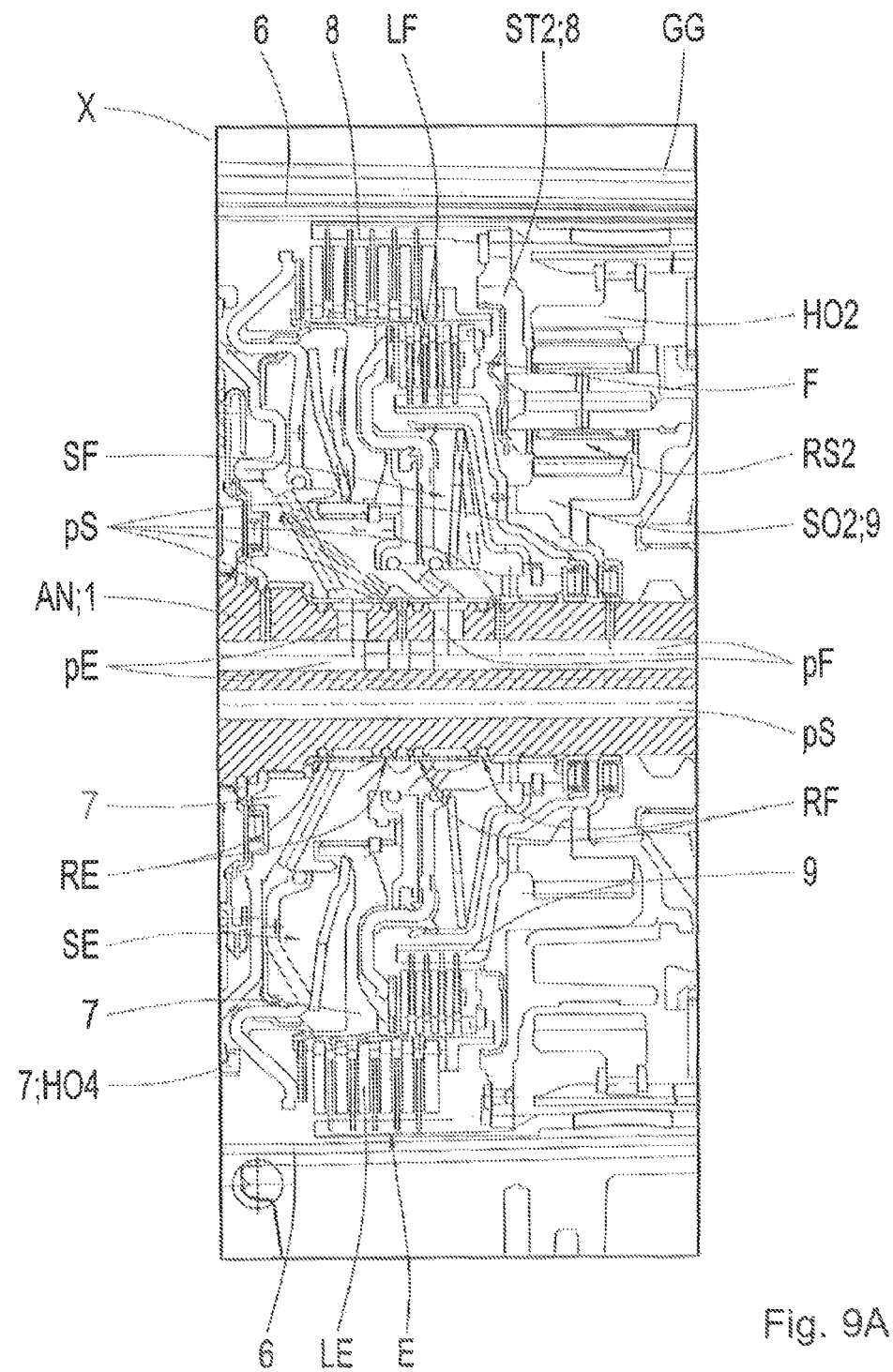
FIG. 9A is a transmission section detail from FIG. 9.

FIG. 9 shows a transmission section of a practically carried out detailed design as an embodiment for the transmission diagram shown in FIG. 8. The transmission section detail designated in FIG. 9 with X is enlarged in FIG. 9A. It is easy to see that two clutches E are combined into one assembly, which is arranged, viewed spatially, in an area axially between the fourth and second planetary gear sets RS4, RS2, comprising the multi-disk pack LE of the clutch E, the servomechanism SE of the clutch E provided for the engaging of the multi-disk pack LE, the multi-disk pack LF of the clutch F, the servomechanism SF of the clutch F provided for the engaging of the multi-disk pack LF, along with a common multi-disk carrier for incorporating the inner multi-disks of the multi-disk pack LE, the outer multi-disks of the multi-disk pack LF, the servomechanism SE and the servomechanism SF. While the multi-disk packs LE, LF of the assembly are arranged radially above each other (multi-disk pack LE radially above multi-disk pack LF), the servomechanisms SE, SF of the assembly are arranged axially next to each other (servomechanism SE adjacent the fourth planetary gear set RS4; servomechanism SF adjacent to the second planetary gear set RS2).

The common (here, by way of example, one-piece) multi-disk carrier features a hub rotatably mounted on the drive shaft AN (shaft 1), which is connected in a torque-proof manner to the ring gear HO4 of the fourth planetary gear set RS4 and forms a section of the shaft 7. The outer multi-disk carrier of the clutch E is connected in a torque-proof manner to the planetary gear carrier ST2 of the second planetary gear set RS2 and is connected in a torque-proof manner to the inner multi-disk carrier of the clutch D and forms a section of the shaft 8. The inner multi-disk carrier of the clutch F is connected in a torque-proof manner to the sun gear SO2 of the second planetary gear set RS2 and forms a section of the shaft 9. Thereby, with the exemplary embodiment shown in FIG. 9, the ring gear HO4 of the fourth planetary gear set RS4, the servomechanism SE provided for actuating the friction element LE of the fifth shift element E and the servomechanism SF for actuating the friction element LF of the sixth shift element F constantly rotates with the same rotational speed as with the exemplary embodiment previously shown in FIG. 6/6A.

In FIG. 9/9A, it can also be seen that the electro-hydraulic control device HSG guides the pressure medium provided by a transmission pump PU, in line with demand, to the individual six shift elements A to F. The pressure medium supply lines at the four clutches C, D, E and F are marked with pC, pD, pE and pF. The servomechanism SC of the clutch C and the servomechanism SE of the clutch E are supplied with pressure medium by the drive shaft AN. The servomechanism SD of the clutch D and the servomechanism SF of the clutch F are supplied with pressure medium by the output shaft AB. In terms of structure, the servomechanisms SC, SD, SE and SF are designed, in a known manner, with one pressure chamber (not more specifically labeled in the figure) and one pressure equalization chamber (not more specifically labeled in the figure) provided for the compensation of the rotational pressure prevailing in the respective pressure chamber. These pressure equalization chambers of the servomechanisms SC, SD, SE and SF are filled with lubricant without pressure, which is supplied from the drive shaft AN through the lubricant supply line pS. In addition, in a known manner, the lubricant supply line pS also supplies the lubrication points in the transmission.

In FIG. 9, it can also be seen that the shift element A is formed as a multi-disk brake, while the shift element B is formed as a claw brake.

As an alternative to the design of the two clutches E and F as multi-disk clutches proposed in the FIGS. 5 to 9, in another embodiment of exemplary aspects of the invention, it may also be provided that the clutch E is formed as a fifth shift element of the automatic transmission as a multi-disk clutch, while the clutch F is formed as the sixth shift element of the automatic transmission as a positive-locking clutch—for example, in the manner of a claw coupling. In this case, it is advantageous if both of the clutches E and F are arranged adjacent to the second planetary gear set RS2, and the clutch F is thereby arranged, viewed spatially, in an area radially below the friction element (that of the multi-disk pack) of the clutch E. Alternatively, the claw coupling F may also be arranged, viewed spatially, at least partially in an area centrally within the sun gear of the second planetary gear set RS2.

If the clutch F is carried out as a positive-locking clutch, in terms of the gear change when using the shifting logic shown in FIGS. 2 and 3, it is advantageous if, upon an upshift from the fifth forward gear, in which the (claw) clutch F does not lead the torque, into the sixth forward gear, in which the (claw) clutch F leads the torque, in the course of this 5-6 upshift, a downshift is initially carried out into the fourth forward gear and a 4-6 direct shift is subsequently carried out into the sixth forward gear. In the shifting sequence, this 4-6 direct shift corresponds to a simple crossover shift with one switched-off friction clutch (here, clutch E) and one switched-on friction clutch (here, clutch C). In principle, this 4-6-direct shift thus corresponds to the 4-5 upshift of the 8-gear automatic transmission known from DE 10 2005 002 337 A1, on the basis of which exemplary aspects of the invention has arisen.

The exemplary embodiment presented in FIG. 1 of all four planetary gear sets RS1, RS2, RS3, RS4 as simple negative planetary gear sets is to be understood as an example. Without changing the kinematics of the gear set system, individual or several negative planetary gear sets can be replaced by positive planetary gear sets. FIG. 10 shows a table with such variations of the planetary gear set models that lead to a technically sensible transmission structure. Below, three examples of these are described in detail. All of the variants listed in the table can shift nine forward gears and one reverse gear through the shifting logic presented in FIG. 2.

Figure 11:
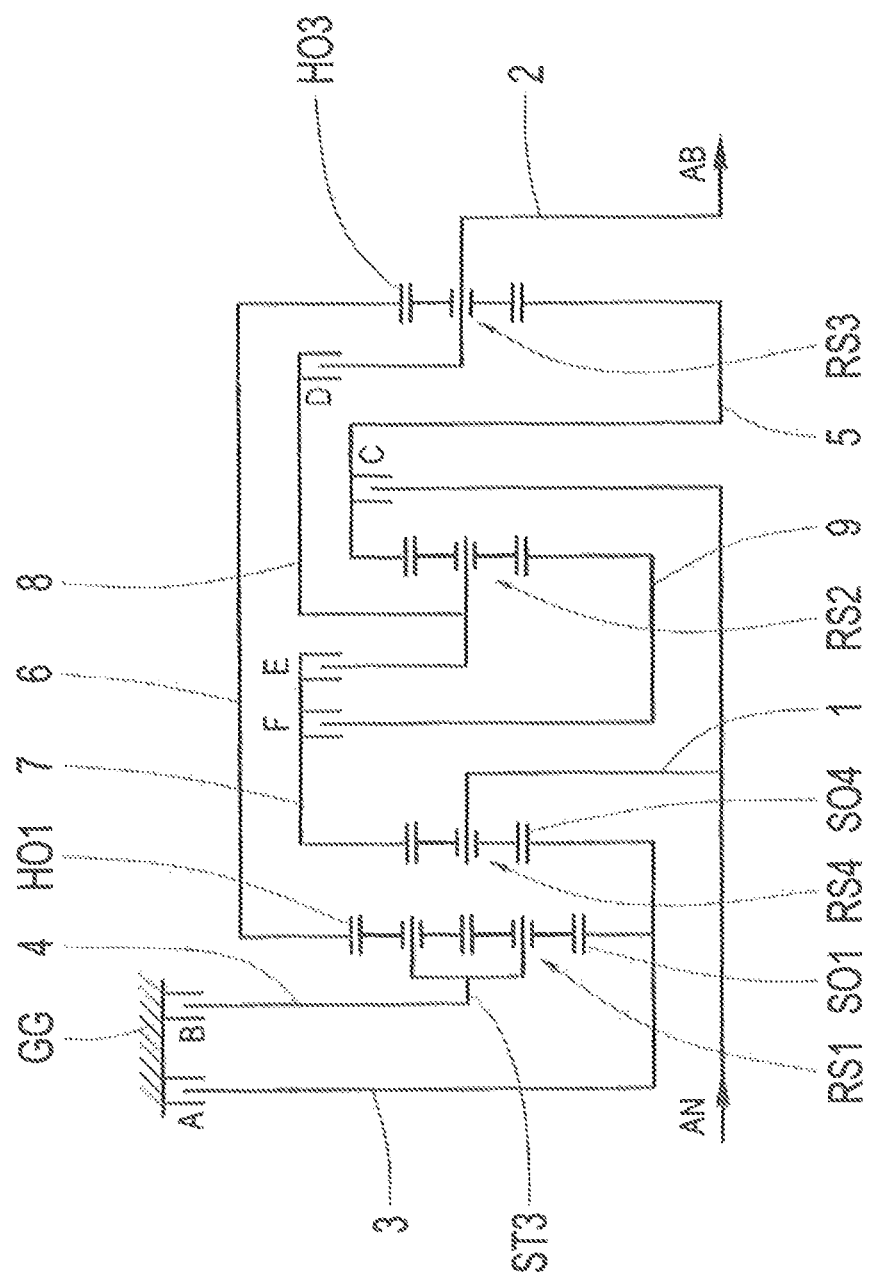
FIG. 11 is a schematic presentation of a fifth embodiment of an automatic transmission in accordance with exemplary aspects of the invention, with one positive planetary gear set and three negative planetary gear sets.

FIG. 11 shows a fifth embodiment of an automatic transmission in accordance with exemplary aspects of the invention. The gear set diagram shown here of a 9-gear automatic transmission corresponds to the kinematics of the gear set diagram of FIG. 1, but with a modified design formation of the first planetary gear set RS1. Thus, the shifting logic of this second exemplary embodiment is the same as in FIG. 2 and FIG. 3. While retaining the exemplary spatial arrangement, taken from FIG. 1, of the four planetary gear sets RS1, RS2, RS3, RS4 coaxially next to each other with the defined order of "first, fourth, second, third planetary gear set" (thus, the arrangement of "RS1-RS4-RS2-RS3"), and while largely retaining the exemplary spatial arrangement, shown in FIG. 5, of the six shift elements A, B, C, D, E and F, the first planetary gear set RS1 is now designed as a positive planetary gear set, while the other three planetary gear sets RS4, RS2 and RS3 are designed as negative planetary gear sets, without any change with respect to FIG. 1.

As shown in FIG. 11, the first element of the first planetary gear set connectable through the brake A to the housing GG, as in FIG. 1, is the sun gear SO1 of the first planetary gear set RS1. Thus, the sun gear SO1 and the sun gear SO4 adjacent to it, as in FIG. 1, form the third shaft 3 of the transmission applying as the first clutch shaft. In contrast to FIG. 1, the second element of the first planetary gear set RS1, which forms, together with the ring gear HO3 of the third planetary gear set RS3, the sixth shaft 6 of the transmission applying as the third clutch shaft, is now the ring gear HO1 of the first planetary gear set RS1. Furthermore, in contrast to FIG. 1, the third element of the first planetary gear set RS1 connectable through the brake B to the transmission housing GG is now the planetary gear carrier ST1 of the first planetary gear set RS1. Thus, the planetary gear carrier ST1 now forms the fourth shaft 4 of the transmission. Thus, in FIG. 11, the coupling of the bar and the ring gear of the first planetary gear set is reversed compared to FIG. 1, with constant kinematics of the gear set system.

Figure 12:
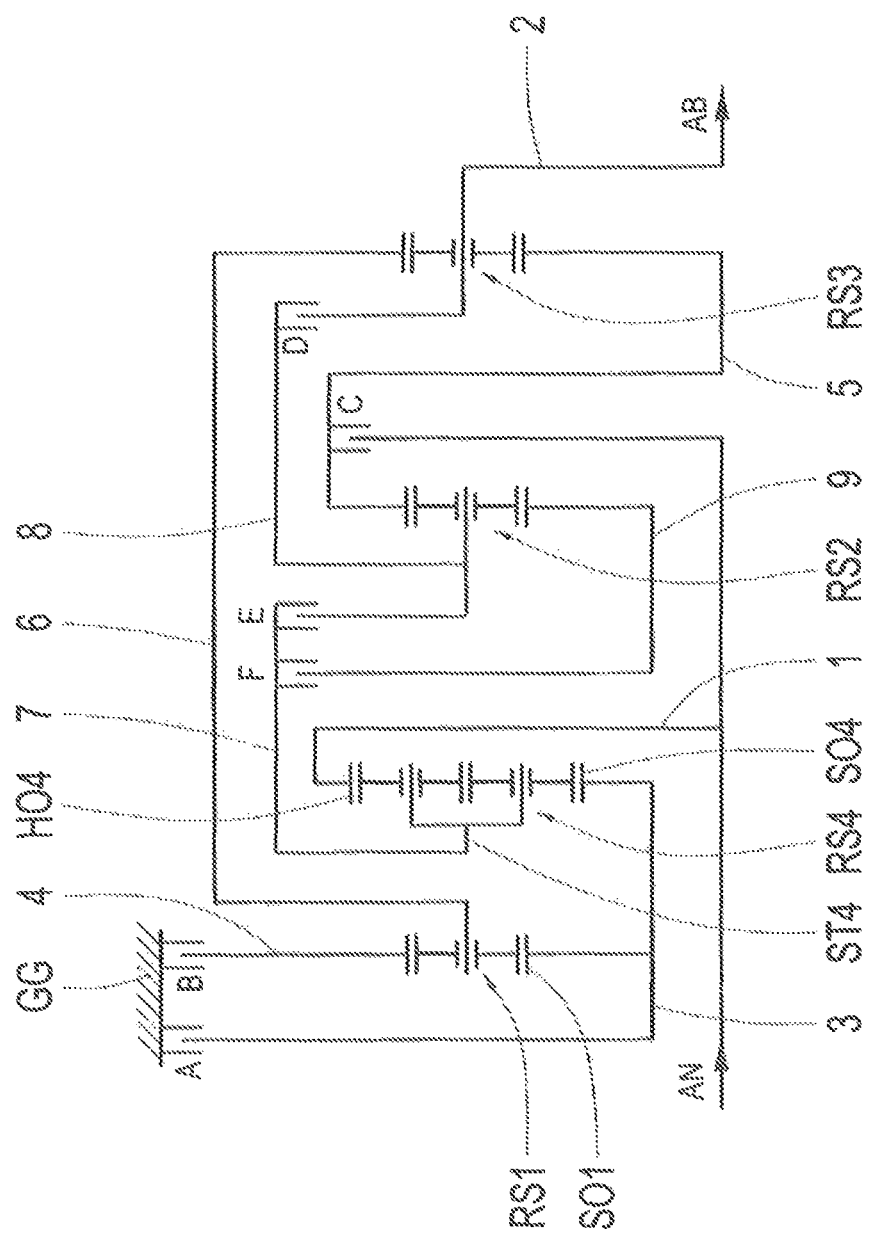
FIG. 12 is a schematic presentation of a sixth embodiment of an automatic transmission in accordance with exemplary aspects of the invention, with one positive planetary gear set and three negative planetary gear sets.

FIG. 12 shows a sixth embodiment of an automatic transmission in accordance with exemplary aspects of the invention. The gear set diagram shown here of a 9-gear automatic transmission also corresponds to the kinematics of the gear set diagram of FIG. 1. While retaining the exemplary spatial arrangement, taken from FIG. 1, of the four planetary gear sets RS1, RS2, RS3, RS4 coaxially next to each other with the defined order of "first, fourth, second, third planetary gear set" (thus, the arrangement of "RS1-RS4-RS2-RS3"), and while largely retaining the exemplary spatial arrangement, shown in FIG. 5, of the six shift elements A, B, C, D, E and F, the fourth planetary gear set RS4 is now designed as a positive planetary gear set, while the other three planetary gear sets RS1, RS2 and RS3 are designed as negative planetary gear sets, without any change with respect to FIG. 1.

As shown in FIG. 12, the first element of the fourth planetary gear set RS4 connectable through the brake A to the housing GG, as in FIG. 1, is the sun gear SO4 of the fourth planetary gear set RS4. Thus, the sun gear SO4 and the sun gear SO1 adjacent to it, as in FIG. 1, form the third shaft 3 of the transmission applying as the first clutch shaft. In contrast to FIG. 1, the second element of the fourth planetary gear set RS4 constantly connected to the first shaft 1 or the drive shaft AN, as the case may be, is now the ring gear HO4 of the fourth planetary gear set RS4. Furthermore, in contrast to FIG. 1, the third element of the first planetary gear set RS1 forming the seventh shaft 7 (constantly connected to the clutch E and clutch F) of the transmission is now the planetary gear carrier ST1 of the fourth planetary gear set RS4. Thus, in FIG. 12, the coupling of the bar and the ring gear of the fourth planetary gear set is reversed compared to FIG. 1, with constant kinematics of the gear set system.

Figure 13:
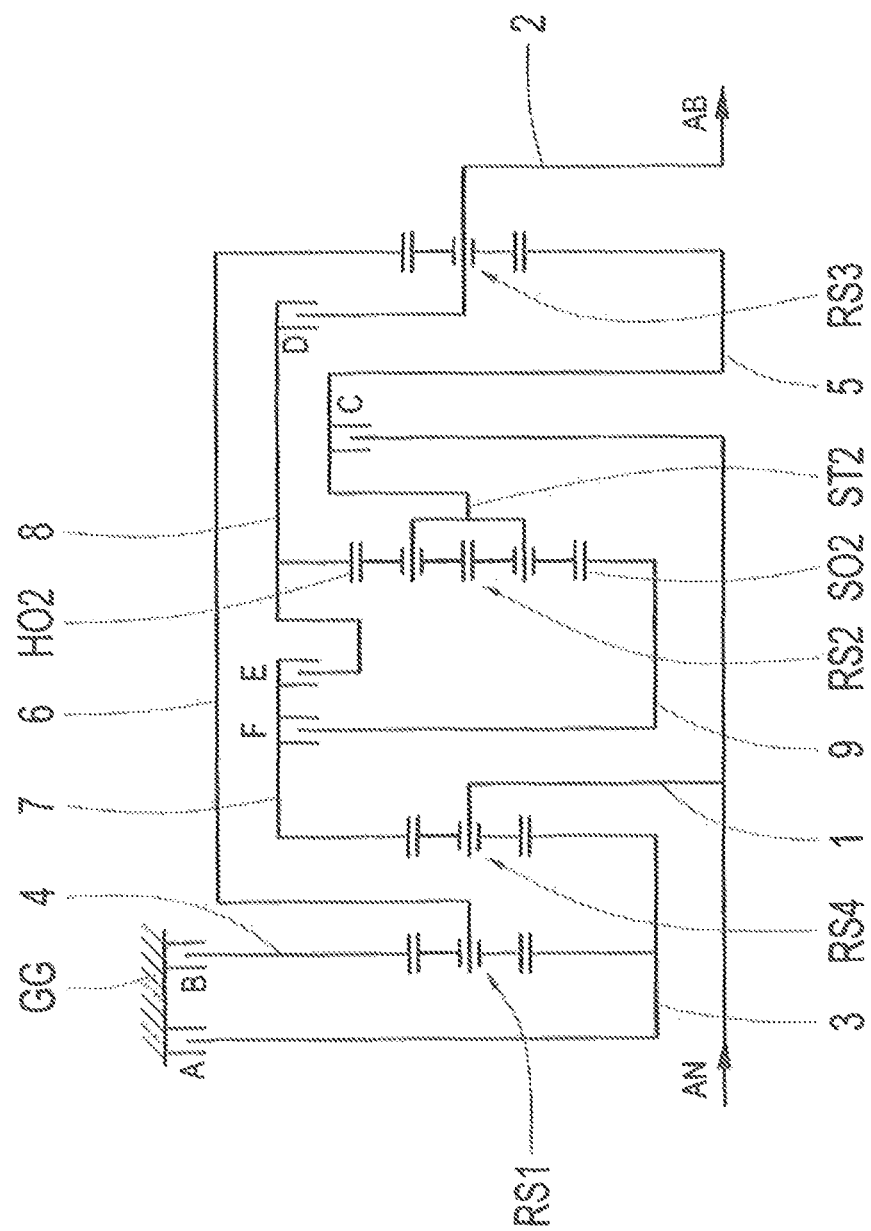
FIG. 13 is a schematic presentation of a seventh embodiment of an automatic transmission in accordance with exemplary aspects of the invention, with one positive planetary gear set and three negative planetary gear sets.

FIG. 13 shows a seventh embodiment of an automatic transmission in accordance with exemplary aspects of the invention. The gear set diagram shown here of a 9-gear automatic transmission also corresponds to the kinematics of the gear set diagram of FIG. 1. While retaining the exemplary spatial arrangement, taken from FIG. 1, of the four planetary gear sets RS1, RS2, RS3, RS4 coaxially next to each other with the defined order of "first, fourth, second, third planetary gear set" (thus, the arrangement of "RS1-RS4-RS2-RS3"), and while largely retaining the exemplary spatial arrangement, shown in FIG. 5, of the six shift elements A, B, C, D, E and F, the second planetary gear set RS2 is now designed as a positive planetary gear set, while the other three planetary gear sets RS1, RS4 and RS3 are designed as negative planetary gear sets, without any change with respect to FIG. 1.

As shown in FIG. 13, the first element of the second planetary gear set RS2 forming the ninth shaft (constantly connected to the clutch F) of the transmission, as in FIG. 1, is the sun gear SO2 of the second planetary gear set RS2. In contrast to FIG. 1, the second element of the second planetary gear set RS2 forming the eighth shaft 8 (constantly connected to the clutch D and clutch E) of the transmission is now the ring gear HO2 of the second planetary gear set RS2. Furthermore, in contrast to FIG. 1, the third element of the second planetary gear set RS2, which forms, together with the sun gear SO3 of the third planetary gear set RS3, the fifth shaft 5 (constantly connected to the clutch C) of the transmission applying as the second clutch shaft, is now the planetary gear carrier ST2 of the second planetary gear set RS2. Thus, in FIG. 13, the coupling of the bar and the ring gear of the second planetary gear set is reversed compared to FIG. 1, with constant kinematics of the gear set system.

From this guidance, the specialist will generate those variants listed in FIG. 10 without any problem, with which, in contrast to FIG. 1, FIG. 11, FIG. 12 and FIG. 13, two or three of the four individual planetary gear sets are designed as positive planetary gear sets. Thereby, in order to retain the kinematics of the gear set system, it is solely the case that the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

Figure 14:
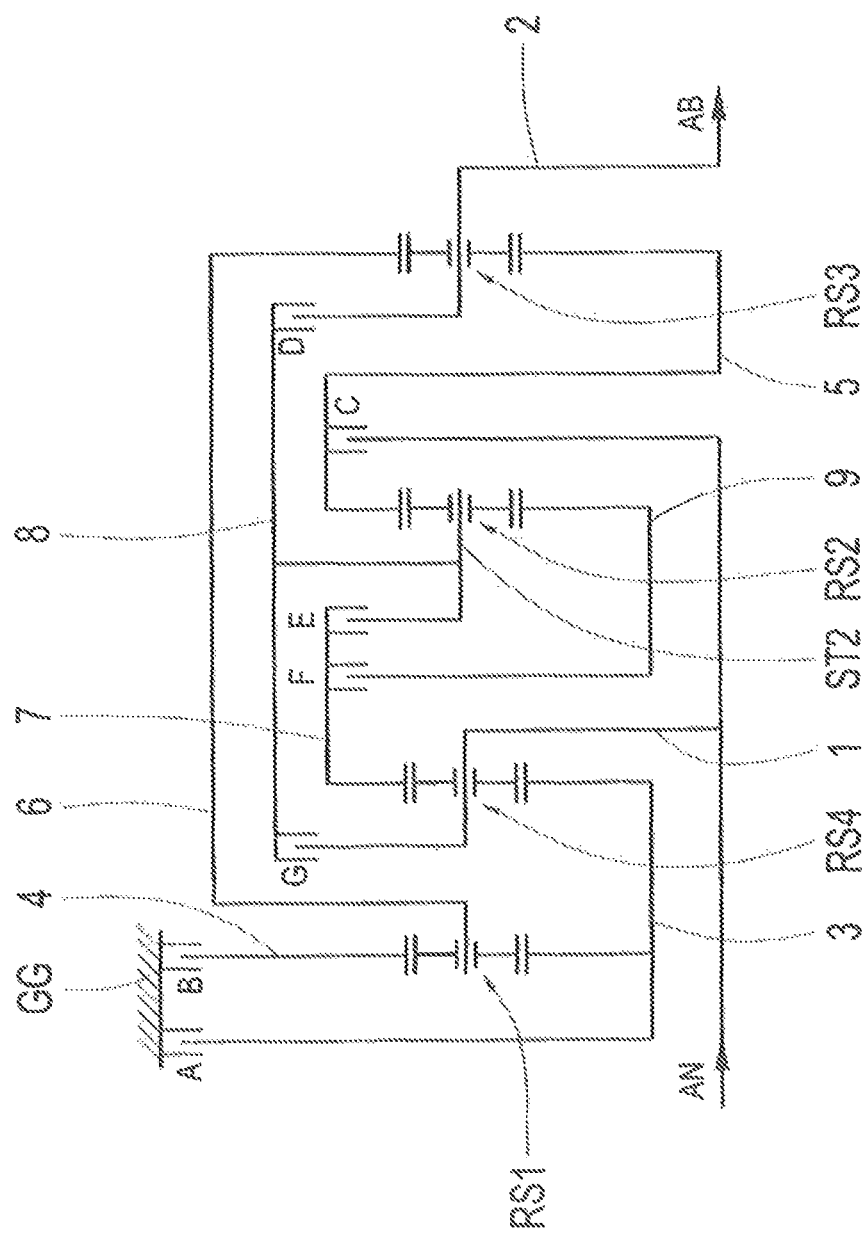
FIG. 14 is a schematic presentation of an eighth embodiment of an automatic transmission in accordance with exemplary aspects of the invention, with one additional shift element.

FIG. 14 shows an eighth embodiment of an automatic transmission in accordance with exemplary aspects of the invention. With the objective of an additional forward gear, without having to significantly change the transmission structure indicated in FIG. 1 and without having to significantly increase the required installation length of the transmission, starting from the transmission diagram shown in FIG. 1 for the transmission in accordance with FIG. 14, an additional seventh shift element G is provided, which is formed as a clutch and is arranged in the power flow between the first shaft 1 (drive shaft AN) and the eighth shaft 8 of the transmission. Thereby, an additional forward gear is achieved below the first gear known from FIG. 2; thus, an additional starting gear with a transmission ratio greater than the transmission ratio of the first gear known from FIG. 2.

As shown in FIG. 1, with the exemplary embodiment presented in FIG. 14, all four planetary gear sets RS1, RS2, RS3, RS4 are formed as simple negative planetary gear sets, each of which features a first, a second and a third element, thus a sun gear, a planetary gear carrier and a ring gear. Thereby, all of the first elements are formed as sun gears, all of the second elements are formed as planetary gear carriers and all of the third elements are formed as ring gears. The spatial arrangement of the four planetary gear sets RS1, RS2, RS3, RS4, coaxially next to each other with the defined order of "first, fourth, second, third planetary gear set" (thus the arrangement of "RS1-RS4-RS2-RS3"), is taken from FIG. 1 without any change.

As also shown in FIG. 14, the spatial arrangement of the six shift elements A, B, C, D, E and F is essentially taken from FIG. 5. In contrast to FIG. 5, the clutches E and F are now arranged on a diameter that is at least similar, axially adjacent to each other, and feature, as an example, a common outer multi-disk carrier.

As also shown in FIG. 14, the clutch G arranged in the power flow between the drive shaft AN (or shaft 1) and the planetary gear carrier ST2 (shaft 8) is, viewed spatially, arranged in an area axially between the first planetary gear set RS1 and the fourth planetary gear set RS4. This allows for the arrangement of the multi-disk pack of the clutch G, which—as will be described later, is engaged only in the first forward gear and thus must transfer a comparatively large torque—has a comparatively large diameter, similar to the diameter of the two ring gears HO1 and HO4. Accordingly, the section of the eighth shaft 8, which is connected (here, by way of example) to the outer multi-disk carrier of the clutch G and the planetary gear carrier ST2 of the second planetary gear set RS2, completely overlaps the eighth shaft 8 of the fourth planetary gear set RS4, by which the planetary gear set RS4 and the clutch G are arranged inside a cylindrical space, which is formed by such section of the shaft 8. In a structurally simple manner, the supply of pressure and lubricant to the clutch G can be realized with minimum leakage loss through the drive shaft AN and the planetary gear carrier ST4 of the fourth planetary gear set RS4, which is constantly connected to the drive shaft.

The spatial arrangement of the clutch G shown here has an exemplary nature; of course, the specialist can also otherwise spatially place the clutch G. For example, viewed spatially, the clutch G is also arranged in an area axially between the second planetary gear set RS2 and the fourth planetary gear set RS4, adjacent to the clutch E. In particular, if the clutch G is designed in the type of a claw coupling, it is advisable that the clutch G is arranged axially adjacent axially to the second planetary gear set RS2 in an area between the second planetary gear set RS2 and the third planetary gear set RS3, thus close to the clutch C.

The expansion of the transmission proposed in FIG. 14 by a seventh shift element G is also combinable with the spatial arrangement proposed in FIG. 4 of four planetary gear sets RS1, RS2, RS3, RS4, arranged coaxially next to each other, with the defined order of "second, fourth, first, third planetary" (thus, the arrangement "RS2-RS4-RS1-RS3"). Here, in order to realize the connection of the clutch G of the first shaft 1 (drive shaft AN) from the eighth shaft 8 (planetary gear carrier ST2), the clutch G may be arranged in an area axially between the second planetary gear set RS2 and the fourth planetary gear set RS4, preferably axially bordering the second planetary gear set RS2, viewed in an axial direction, next to the clutch C and, optionally, radially above the clutch E.

FIG. 15 presents an exemplary shifting diagram of the 10-gear automatic transmission in accordance with exemplary aspects of the invention in accordance with FIG. 14. In each gear, four shift elements are engaged and three shift elements are open. Furthermore, it may be taken from the shifting diagram that, upon a sequential shifting operation, thus upon upshifts and downshifts by one gear, so-called "group gearshifts" can be avoided, since two gears adjacent in the shifting logic always jointly use two shift elements. The first forward gear is particularly well-suited as a so-called "crawler," with a smaller overall transmission ratio for a large pulling force. The eighth forward gear is formed as a direct gear, such that three forward gears of an overdrive nature are available.

The exemplary embodiment presented in FIG. 14 of all four planetary gear sets RS1, RS2, RS3, RS4 as simple negative planetary gear sets is to be understood as an example. Without changing the kinematics of the gear set system, individual or several negative planetary gear sets can be replaced by positive planetary gear sets. FIG. 16 shows a table with such variations of the planetary gear set models that lead to a technically sensible transmission structure. Below, two examples of these are described in detail. All of the variants listed in the table can shift ten forward gears and one reverse gear through the shifting logic presented in FIG. 15.

FIG. 17 shows a ninth embodiment of an automatic transmission in accordance with exemplary aspects of the invention. The gear set diagram shown here of a 10-gear automatic transmission corresponds to the kinematics of the gear set diagram of FIG. 14, but with a modified design formation of the first planetary gear set RS1. Thus, the shifting logic of this second exemplary embodiment is the same as in FIG. 15. While retaining the exemplary spatial arrangement, taken from FIG. 14, of the four planetary gear sets RS1, RS2, RS3, RS4 coaxially next to each other with the defined order of "first, fourth, second, third planetary gear set" (thus, the arrangement of "RS1-RS4-RS2-RS3"), and while retaining the exemplary spatial arrangement, taken from FIG. 14, of seven shift elements A, B, C, D, E, F and G, the first planetary gear set RS1 is now designed as a positive planetary gear set, while the other three planetary gear sets RS4, RS2 and RS3 are designed as negative planetary gear sets, without any change with respect to FIG. 1.

As shown in FIG. 17, the first element of the first planetary gear set RS1 connectable through the brake A to the housing GG, as in FIG. 12, is the sun gear SO1 of the first planetary gear set RS1. Thus, the sun gear SO1 and the sun gear SO4 adjacent to it, as in FIG. 14, form the third shaft 3 of the transmission applying as the first clutch shaft. In contrast to FIG. 14, the second element of the first planetary gear set RS1, which forms, together with the ring gear HO3 of the third planetary gear set RS3, the sixth shaft 6 of the transmission applying as the third clutch shaft, is now the ring gear HO1 of the first planetary gear set RS1. Furthermore, in contrast to FIG. 14, the third element of the first planetary gear set RS1 connectable through the brake B to the transmission housing GG is now the planetary gear carrier ST1 of the first planetary gear set RS1. Thus, the planetary gear carrier ST1 now forms the fourth shaft 4 of the transmission. Thus, in FIG. 17, the coupling of the planetary gear carrier and the ring gear of the first planetary gear set is reversed compared to FIG. 14, with constant kinematics of the gear set system.

FIG. 18 shows a tenth embodiment of an automatic transmission in accordance with exemplary aspects of the invention. The gear set diagram shown here of a 10-gear automatic transmission also corresponds to the kinematics of the gear set diagram of FIG. 14. While retaining the exemplary spatial arrangement, taken from FIG. 14, of the four planetary gear sets RS1, RS2, RS3, RS4 coaxially next to each other with the defined order of "first, fourth, second, third planetary gear set" (thus, the arrangement of "RS1-RS4-RS2-RS3"), and while retaining the exemplary spatial arrangement, taken from FIG. 12, of seven shift elements A, B, C, D, E, F and G, the second planetary gear set RS2 is now designed as a positive planetary gear set, while the other three planetary gear sets RS1, RS4 and RS3 are designed as negative planetary gear sets, without any change with respect to FIG. 14.

As shown in FIG. 18, the first element of the second planetary gear set RS2 forming the ninth shaft 9 (constantly connected to the clutch F) of the transmission, as in FIG. 14, is the sun gear SO2 of the second planetary gear set RS2. In contrast to FIG. 14, the second element of the second planetary gear set RS2 forming the eight shaft 8 (constantly connected to the three clutches D, E, G) of the transmission is now the ring gear HO2 of the second planetary gear set RS2. Furthermore, in contrast to FIG. 14, the third element of the second planetary gear set RS2, which forms, together with the sun gear SO3 of the third planetary gear set RS3, the fifth shaft 5 (constantly connected to the clutch C) of the transmission applying as the second clutch shaft, is now the planetary gear carrier ST2 of the second planetary gear set RS2. Thus, in FIG. 18, the coupling of the planetary gear carrier and the ring gear of the second planetary gear set is reversed compared to FIG. 14, with constant kinematics of the gear set system.

From this guidance, the specialist will generate those variants listed in FIG. 16 without any problem, with which, in contrast to FIG. 14, FIG. 17 and FIG. 18, two of the four individual planetary gear sets are designed as positive planetary gear sets and two of the four individual planetary gear sets. Thereby, in order to retain the kinematics of the gear set system, it is solely the case that the first element of each negative planetary gear set must be formed as a sun gear, the second element of each negative planetary gear set must be formed as a planetary gear carrier and the third element of each negative planetary gear set must be formed as a ring gear, while the first element of each positive planetary gear set must be formed as a sun gear, the second element of each positive planetary gear set must be formed as a ring gear and the third element of each positive planetary gear set must be formed as a planetary gear carrier.

Modifications and variations can be made to the embodiments illustrated or described herein without departing from the scope and spirit of the invention as set forth in the appended claims.

REFERENCE SIGNS

1 First shaft
2 Second shaft
3 Third shaft, first clutch shaft
4 Fourth shaft
5 Fifth shaft, second clutch shaft
6 Sixth shaft, third clutch shaft
7 Seventh shaft
8 Eighth shaft
9 Ninth shaft
A First shift element, first brake
B Second shift element, second brake
C Third shift element, first clutch
D Fourth shift element, second clutch
E Fifth shift element, third clutch
F Sixth shift element, fourth clutch
AN Drive shaft
AB Output shaft
GG Housing
RS1 First planetary gear set
SO1 Sun gear of the first planetary gear set
ST1 Planetary gear carrier of the first planetary gear set
PL1 Planetary gears of the first planetary gear set
HO1 Ring gear of the first planetary gear set
RS2 Second planetary gear set
SO2 Sun gear of the second planetary gear set
ST2 Planetary gear carrier of the second planetary gear set
PL2 Planetary gears of the second planetary gear set
HO2 Ring gear of the second planetary gear set
RS3 Third planetary gear set SO3 Sun gear of the third planetary gear set
ST3 Planetary gear carrier of the third planetary gear set
PL3 Planetary gears of the third planetary gear set
HO3 Ring gear of the third planetary gear set
RS4 Fourth planetary gear set
SO4 Sun gear of the fourth planetary gear set
ST4 Planetary gear carrier of the fourth planetary gear set
PL4 Planetary gears of the fourth planetary gear set
HO4 Ring gear of the fourth planetary gear set
i Transmission ratio
phi Progressive step
pC Pressure supply line to the third shift element
pD Pressure supply line to the fourth shift element
pE Pressure supply line to the fifth shift element
pF Pressure supply line to the sixth shift element
pS Lubricant supply line
HGS Electro-hydraulic control device
PU Transmission pump
LE Friction element, multi-disk pack of the fifth shift element
LF Friction element, multi-disk pack of the sixth shift element
RE Plain compression ring seal for the supply of pressure to the fifth shift element
RF Plain compression ring seal for the supply of pressure to the sixth shift element
SC Servomechanism of the third shift element
SD Servomechanism of the fourth shift element
SE Servomechanism of the fifth shift element
SF Servomechanism of the sixth shift element
X Transmission section detail

The invention claimed is:

1. An automatic transmission for a motor vehicle, comprising:
    a housing;
    a drive shaft;
    an output shaft;
    a plurality of planetary gear sets, each planetary gear set of the plurality of planetary gear sets having three elements;
    six shift elements, selective engaging of which brings about different transmission ratio relationships between the drive shaft and the output shaft;
    a first shaft constantly connecting a first planetary gear set of the plurality of planetary gear sets to a fourth planetary gear set of the plurality of planetary gear sets;
    a second shaft constantly connecting a second planetary gear set of the plurality of planetary gear sets to a third planetary gear set of the plurality of planetary gear sets;
    a third shaft constantly connecting the third planetary gear set to the first planetary gear set; and
    wherein the drive shaft is constantly connected to the fourth planetary gear set, the output shaft is constantly connected to the third planetary gear set, the first planetary gear set is directly connected to two shift elements of the six shift elements, the second planetary gear set is directly connected to four shift elements of the six shift elements, the third planetary gear set is directly connected to two shift elements of the six shift elements, the fourth planetary gear set is directly connected to four shift elements of the six shift elements, the drive shaft is directly connected to one shift element of the six shift elements and the output shaft is directly connected to one shift element of the six shift elements.

2. The automatic transmission of claim 1, wherein a first shift element of the six shift elements is directly connected to the first and fourth planetary gear sets, a second shift element of the six shift elements is directly connected to the first planetary gear set, a third shift element of the six shift elements is directly connected to the second, third and fourth planetary gear sets and the drive shaft, a fourth shift element of the six shift elements is directly connected to the second and third planetary gear sets and the output shaft, a fifth shift element of the six shift elements is directly connected to the second and fourth planetary gear sets and a sixth shift element of the six shift elements is directly connected to the second and fourth planetary gear sets.

3. The automatic transmission of claim 1, wherein a fourth shift element and a fifth shift element of the six shift elements are directly connected to each other.

4. The automatic transmission of claim 1, wherein a fifth shift element and a sixth shift element of the six shift elements are directly connected to each other.

5. The automatic transmission of claim 1, wherein the second planetary gear set is blockable through simultaneous engaging of two shift elements of the six shift elements, such that rotational speeds of a sun gear, a planetary gear carrier and a ring gear of the second planetary gear set are identical.

6. The automatic transmission of claim 5, wherein the second planetary gear set is blockable through the simultaneous engaging of a fifth shift element and a sixth shift element of the six shift elements.

7. The automatic transmission of claim 1, wherein four of the six shift elements are engaged in any gear and, upon a change from one gear to a subsequent higher or lower gear, only one previously engaged shift element is opened and one previously open shift element is engaged.

8. The automatic transmission of claim 1, wherein the automatic transmission is shiftable between nine forward gears and one reverse gear, wherein
    in a first forward gear of the nine forward gears, a first, a second, a third and a sixth shift element of the six shift elements are engaged;
    in a second forward gear of the nine forward gears, the first, the second and the sixth shift elements and a fifth shift element of the six shift elements are engaged;
    in a third forward gear of the nine forward gears, the second, the third, the fifth and the sixth shift elements are engaged;
    in a fourth forward gear of the nine forward gears, the second, the fifth and the sixth shift elements and a fourth shift element of the six shift elements are engaged;
    in a fifth forward gear of the nine forward gears, the second, the third, the fourth and the fifth shift elements are engaged;
    in a sixth forward gear of the nine forward gears, the second, the third, the fourth and the sixth shift elements are engaged;
    in a seventh forward gear of the nine forward gears, the third, the fourth, the fifth and the sixth shift elements are engaged;
    in an eighth forward gear of the nine forward gears, the first, the third, the fourth and the sixth shift elements are engaged;
    in a ninth forward gear of the nine forward gears, the first, the fourth, the fifth and the sixth shift elements are engaged; and
    in the reverse gear, the first, the second, the fourth and the sixth shift elements are engaged.

9. The automatic transmission of claim 8, wherein the fifth shift element is a multi-disk clutch and that the sixth shift element is a positive-locking clutch, wherein upon an upshift from a forward gear, in which the sixth shift element is not engaged, into a target gear that is next higher from the gear step, in which the sixth shift element is engaged, a downshift is initially carried out into the forward gear next lower from the gear step and a direct shift is subsequently carried out into the target gear.

10. The automatic transmission of claim 9, wherein the sixth shift element is disposed radially below a friction element of the fifth shift element.

11. The automatic transmission of claim 1, wherein the first shaft constantly connects a first element of the first planetary gear set to a first element of the fourth planetary gear set.

12. The automatic transmission of claim 1, wherein the second shaft constantly connects a third element of the second planetary gear set to a first element of the third planetary gear set.

13. The automatic transmission of claim 1, wherein the third shaft constantly connects a third element of the third planetary gear set to a second element of the first planetary gear set.

14. The automatic transmission of claim 1, wherein the drive shaft is constantly connected to a second element of the fourth planetary gear set.

15. The automatic transmission of claim 1, wherein the output shaft is constantly connected to a second element of the third planetary gear set.

16. The automatic transmission of claim 1, wherein the first shift element of the six shift elements is arranged in the power flow between a first element of the first planetary gear set and the housing.

17. The automatic transmission of claim 1, wherein the second shift element of the six shift elements is arranged in the power flow between a third element of the first planetary gear set and the housing.

18. The automatic transmission of claim 1, wherein the third shift element of the six shift elements is arranged in the power flow between a first element of the third planetary gear set and the drive shaft.

19. The automatic transmission of claim 1, wherein the fourth shift element of the six shift elements is arranged in the power flow between a second element of the second planetary gear set and a second element of the third planetary gear set.

20. The automatic transmission of claim 1, wherein a fifth shift element of the six shift elements is arranged in the power flow between a second element of the second planetary gear set and a third element of the fourth planetary gear set.

21. The automatic transmission of claim 1, wherein a sixth shift element of the six shift elements is arranged in the power flow between a first element of the second planetary gear set and a third element of the fourth planetary gear set.

22. The automatic transmission of claim 1, wherein the planetary gear sets of the plurality of planetary gear sets are negative planetary gear sets.

23. The automatic transmission of claim 1, wherein one planetary gear set of the plurality of planetary gear sets is a positive planetary gear set, while the other planetary gear sets of the plurality of planetary gear sets are negative planetary gear sets.

24. The automatic transmission of claim 23, wherein one of the first planetary gear set, the second planetary gear set or the fourth planetary gear set is the positive planetary gear set.

25. The automatic transmission of claim 1, wherein two planetary gear sets of the plurality of planetary gear sets are positive planetary gears sets and the other two planetary gear sets of the plurality of planetary gear sets are negative planetary gear sets.

26. The automatic transmission of claim 25, wherein the first planetary gear set and the second planetary gear set are positive planetary gear sets.

27. The automatic transmission of claim 1, wherein the third planetary gear set is a negative planetary gear set, while the first planetary gear set, the second planetary gear set and the fourth planetary gear set are positive planetary gear sets.

28. The automatic transmission of claim 1, wherein each planetary gear set of the plurality of planetary gear sets is a negative planetary gear set or a positive planetary gear set,
a first element of each negative planetary gear set and a first element of each positive planetary gear set is a sun gear;
a second element of each negative planetary gear set is a planetary gear carrier, while a second element of each positive planetary gear set is a ring gear;
a third element of each negative planetary gear set is a ring gear, while a third element of each positive planetary gear set is a planetary gear carrier.

29. The automatic transmission of claim 28, wherein a sixth shift element of the six shift elements is disposed directly adjacent the second planetary gear set, and axially between the fourth planetary gear set and the second planetary gear set or axially between the second planetary gear set and the third planetary gear set or centrally within a sun gear of the second planetary gear set.

30. The automatic transmission of claim 28, wherein the ring gear of the fourth planetary gear set, a servomechanism for actuating a friction element of the fifth shift element and a servomechanism for actuating the friction element of the sixth shift element constantly rotate with a common rotational speed.

31. The automatic transmission of claim 30, wherein the servomechanism for actuating the friction element of the sixth shift element is positioned directly next to the servomechanism for actuating the friction element of the fifth shift element.

32. The automatic transmission of claim 1, wherein the planetary gear sets of the plurality of planetary gear sets are arranged coaxially next to one another in order of the second planetary gear set, the fourth planetary gear set, the first planetary gear set, and the third planetary gear set along an axial direction.

33. The automatic transmission of claim 1, wherein the planetary gear sets of the plurality of planetary gear sets are arranged coaxially next to one another in order of the first planetary gear set, the fourth planetary gear set, the second planetary gear set, and the third planetary gear set along an axial direction.

34. The automatic transmission of claim 1, wherein a fifth shift element of the six shift elements is disposed axially between the fourth planetary gear set and the second planetary gear set or axially between the second planetary gear set and the third planetary gear set.

35. The automatic transmission of claim 1, wherein a fifth shift element and a sixth shift element of the six shift elements are multi-disk clutches and are disposed axially between the fourth planetary gear set and the second planetary gear set, wherein a friction element of the fifth shift element is positioned radially above a friction element the sixth shift element.

* * * * *